US008934438B2

(12) United States Patent
Dinan

(10) Patent No.: US 8,934,438 B2
(45) Date of Patent: Jan. 13, 2015

(54) UPLINK TRANSMISSION TIMING ADVANCE IN A WIRELESS DEVICE AND BASE STATION

(71) Applicant: Esmael Hejazi Dinan, Herndon, VA (US)

(72) Inventor: Esmael Hejazi Dinan, Herndon, VA (US)

(73) Assignee: Ofinno Technologies, LLC, Herndon, VA (US)

(*) Notice: Subject to any disclaimer, the term of this patent is extended or adjusted under 35 U.S.C. 154(b) by 132 days.

(21) Appl. No.: 13/787,446

(22) Filed: Mar. 6, 2013

(65) Prior Publication Data
US 2013/0258959 A1 Oct. 3, 2013

Related U.S. Application Data

(60) Provisional application No. 61/618,830, filed on Apr. 1, 2012, provisional application No. 61/662,191, filed on Jun. 20, 2012.

(51) Int. Cl.
H04W 72/04 (2009.01)
H04W 74/08 (2009.01)
H04W 56/00 (2009.01)

(52) U.S. Cl.
CPC .......... H04W 74/0833 (2013.01); H04W 56/00 (2013.01)
USPC ........... 370/329; 370/350; 370/341; 370/500; 455/434; 455/450

(58) Field of Classification Search
CPC . H04L 12/407; H04L 12/413; H04L 27/2611; H04W 16/24; H04W 16/32; H04W 40/32; H04W 56/001–56/004; H04W 56/0015; H04W 74/08; H04W 74/088; H04W 74/0816; H04W 74/0833; H04W 74/04
USPC ........... 370/310, 324, 350, 395.62, 328–329, 370/338–339, 341, 500; 455/443, 450–452, 455/456.1
See application file for complete search history.

(56) References Cited

U.S. PATENT DOCUMENTS

2007/0189205 A1 8/2007 Terry et al.
2010/0227569 A1 9/2010 Bala et al.
(Continued)

FOREIGN PATENT DOCUMENTS

WO WO2011/120716 A1 10/2011

OTHER PUBLICATIONS

3GPP TSG RAN WG2 Meeting #76, R2-115791 San Francisco, USA, Nov. 14-18, 2011 Source: CATT Title: Signaling for TAG configuration.
(Continued)

Primary Examiner — Bob Phunkulh
Assistant Examiner — Mohamed Kamara
(74) Attorney, Agent, or Firm — Esmael Dinan; David Grossman

(57) ABSTRACT

A wireless device updates a first timing advance of a secondary cell group employing first timing advance command(s) for the secondary cell group. The wireless device stores the first timing advance upon expiry of an associated time alignment timer. The wireless device receives a second timing advance command for the secondary cell group with a timing advance value of zero. The second timing advance command starts the associated time alignment timer. The wireless device transmits uplink signals in radio resources identified in a received uplink grant employing the stored first timing advance.

20 Claims, 14 Drawing Sheets

(56) References Cited

U.S. PATENT DOCUMENTS

| | | | |
|---|---|---|---|
| 2010/0302998 A1* | 12/2010 | Bao et al. | 370/315 |
| 2011/0222492 A1* | 9/2011 | Borsella et al. | 370/329 |
| 2011/0223932 A1* | 9/2011 | Hole et al. | 455/456.1 |
| 2011/0261776 A1 | 10/2011 | Ahn et al. | |
| 2011/0268032 A1 | 11/2011 | Kim et al. | |
| 2011/0299489 A1 | 12/2011 | Kim et al. | |
| 2012/0008600 A1 | 1/2012 | Marinier et al. | |
| 2012/0014371 A1* | 1/2012 | Weng et al. | 370/350 |
| 2012/0076103 A1 | 3/2012 | Dai et al. | |
| 2012/0113914 A1 | 5/2012 | Zhao et al. | |
| 2012/0113941 A1 | 5/2012 | Chung et al. | |
| 2012/0113962 A1 | 5/2012 | Jen | |
| 2012/0243498 A1 | 9/2012 | Kwon et al. | |
| 2012/0250520 A1 | 10/2012 | Chen et al. | |
| 2012/0300743 A1 | 11/2012 | Kim et al. | |
| 2012/0307811 A1 | 12/2012 | Kwon et al. | |
| 2013/0044843 A1* | 2/2013 | Malkamaki et al. | 375/356 |

OTHER PUBLICATIONS

3GPP TSG-RAN WG2 Meeting #74 R2-113014 Barcelona, Spain, May 9-13, 2011 Source: Renesas Mobile Europe Title: Multiple timing advance using multiple RACH.

3GPP TSG-RAN WG2 Meeting #75bis R2-115181 Zhuhai, China, Oct. 10-14, 2011 Source: Nokia Siemens Networks, Nokia Corporation Title: TA group configuration and reconfiguration.

3GPP TSG-RAN WG2 Meeting#72bis, Tdoc R2-110356 Dublin, Ireland, Jan. 17-21, 2011 Source: ITRI Title: RF Receiver Information in UE Capability Signalling.

3GPP TSG RAN WG2 Meeting #77bis R2-121140 Jeju, Korea, Mar. 26-30, 2012 Source: CATT Title: Consideration on Multi-TA Capability.

3GPP TSG-RAN WG2 Meeting #76 R2-115757 San Francisco, USA, Nov. 14-18, 2011 R2-114939 Source: Nokia Siemens Networks, Nokia Corporation Title: MAC Downlink Signalling for Multiple TA.

3GPP TSG-RAN WG2 #74 Tdoc R2-113258 Barcelona, Spain, May 9-13, 2011 Source: InterDigital Communications Title: Support for RACH on SCells in LTE CA.

3GPP TSG RAN WG2 Meeting #77bis, R2-121192 Jeju, Korea, Mar. 26-30, 2012 Source: New Postcom Title: Path loss reference and RLM on SCell.

3GPP TSG RAN WG2 Meeting #77 R2-120732 Dresden, Germany, Feb. 6-10, 2012 Source: Fujitsu Title: Discussion on PHR for SCell in Rel-11.

3GPP TSG-RAN WG2#77, R2-120218 Dresden, Germany, Feb. 6-10, 2012 Source: Sharp Title: TA group handling.

3GPP TSG RAN WG2 #69bis R2-102395 Beijing, China, Apr. 12-16, 2010 Source: Qualcomm Incorporated Title: UL and DL Component Carrier Linking.

3GPP TS 36.211 V10.0.0 (Dec. 2010), 3rd Generation Partnership Project; Technical Specification Group Radio Access Network; Evolved Universal Terrestrial Radio Access (E-UTRA); Physical channels and modulation (Release 10).

3GPP TS 36.212 V10.0.0 (Dec. 2010), 3rd Generation Partnership Project; Technical Specification Group Radio Access Network; Evolved Universal Terrestrial Radio Access (E-UTRA); Multiplexing and channel coding (Release 10).

3GPP TS 36.213 V10.0.0 (Dec. 2010), 3rd Generation Partnership Project; Technical Specification Group Radio Access Network; Evolved Universal Terrestrial Radio Access (E-UTRA); Physical layer procedures (Release 10).

3GPP TS 36.300 V10.2.0 (Dec. 2010), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10).

3GPP TS 36.321 V10.0.0 (Dec. 2010), 3rd Generation Partnership Project; Technical Specification Group Radio Access Network; Evolved Universal Terrestrial Radio Access (E-UTRA); Medium Access Control (MAC) protocol specification (Release 10).

3GPP TS 36.331 V10.0.0 (Dec. 2010), 3rd Generation Partnership Project; Technical Specification Group Radio Access Network; Evolved Universal Terrestrial Radio Access (E-UTRA); Radio Resource Control (RRC); Protocol specification (Release 10).

\* cited by examiner

UPLINK TRANSMISSION TIMING ADVANCE IN A WIRELESS DEVICE AND BASE STATION

CROSS-REFERENCE TO RELATED APPLICATIONS

This application claims the benefit of U.S. Provisional Application No. 61/618,830, filed Apr. 1, 2012, entitled "Timing Management in Wireless Networks," and U.S. Provisional Application No. 61/662,191, filed Jun. 20, 2012, entitled "Timing Advance in Carrier Aggregation," which are hereby incorporated by reference in its entirety.

BRIEF DESCRIPTION OF THE SEVERAL VIEWS OF THE DRAWINGS

Examples of several of the various embodiments of the present invention are described herein with reference to the drawings, in which.

DETAILED DESCRIPTION OF EMBODIMENTS

Example embodiments of the present invention enable operation of multiple timing advance groups. Embodiments of the technology disclosed herein may be employed in the technical field of multicarrier communication systems. More particularly, the embodiments of the technology disclosed herein may relate to operation of multiple timing advance groups.

Example embodiments of the invention may be implemented using various physical layer modulation and transmission mechanisms. Example transmission mechanisms may include, but are not limited to: CDMA (code division multiple access), OFDM (orthogonal frequency division multiplexing), TDMA (time division multiple access), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM (quadrature amplitude modulation) using BPSK (binary phase shift keying), QPSK (quadrature phase shift keying), 16-QAM, 64-QAM, 256-QAM, and/or the like. Physical radio transmission may be enhanced by dynamically or semi-dynamically changing the modulation and coding scheme depending on transmission requirements and radio conditions.

Figure 1:
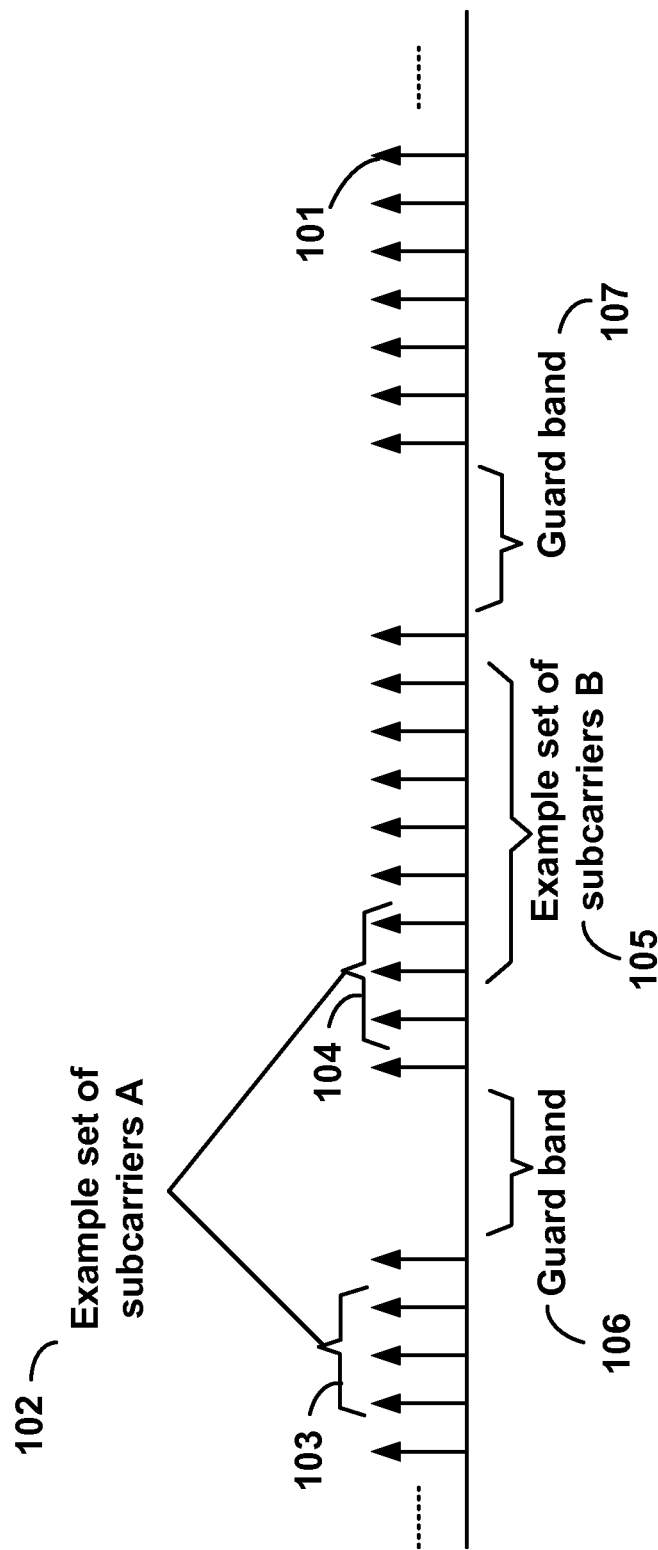
FIG. 1 is a diagram depicting example sets of OFDM subcarriers as per an aspect of an embodiment of the present invention.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, SC-OFDM (single carrier-OFDM) technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
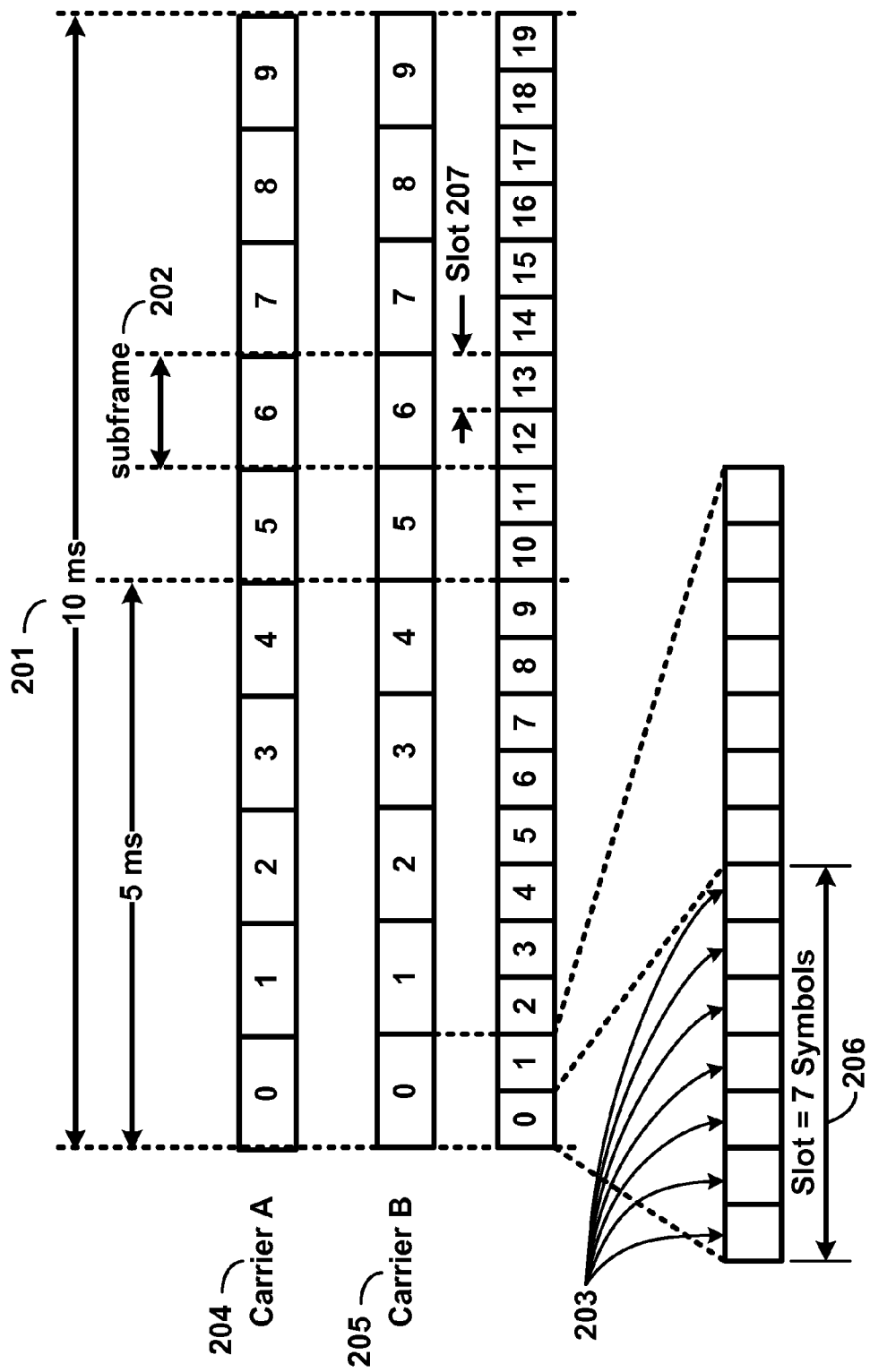
FIG. 2 is a diagram depicting an example transmission time and reception time for two carriers in a carrier group as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD (frequency division duplex) and TDD (time division duplex) duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized sub-frames 202. Other sub-frame durations such as including 0.5 msec, 1 msec, 2 msec, and 5 msec may also be supported. Sub-frame(s) may consist of two or more slots 206. For the example of FDD, 10 sub-frames may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

Figure 3:
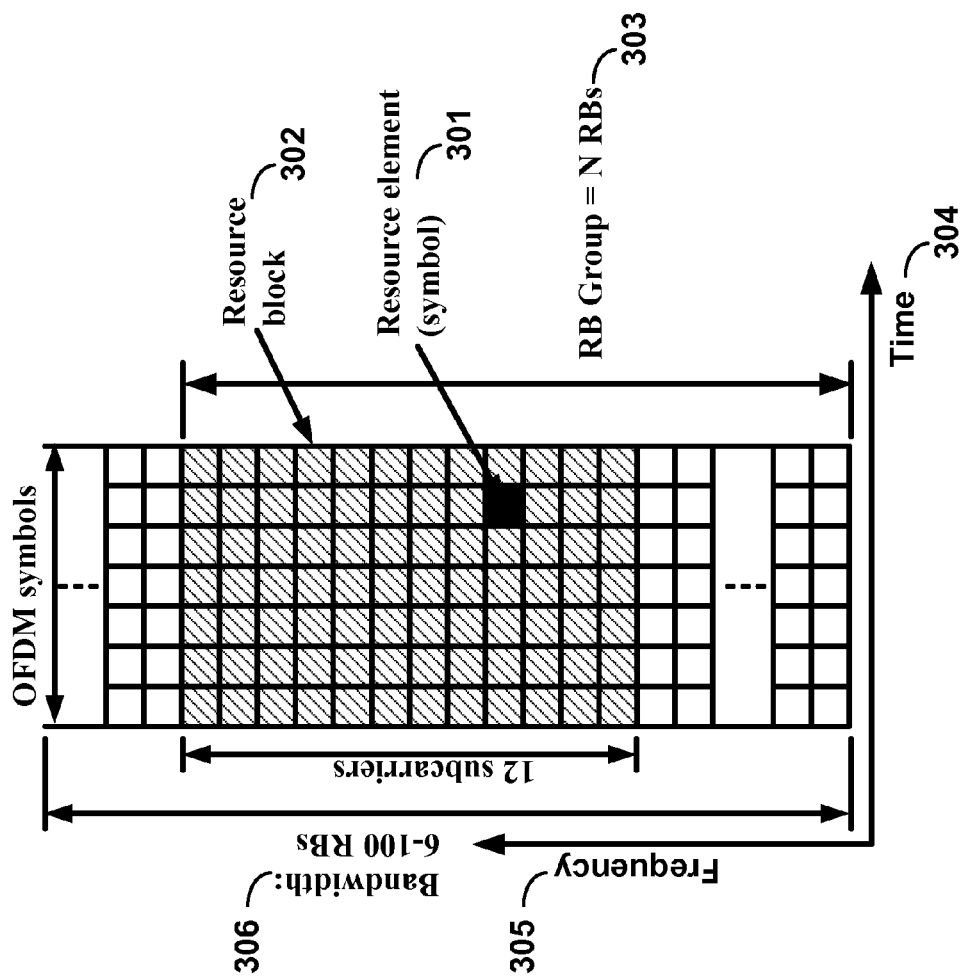
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or resource blocks (RB) (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

Figure 4:
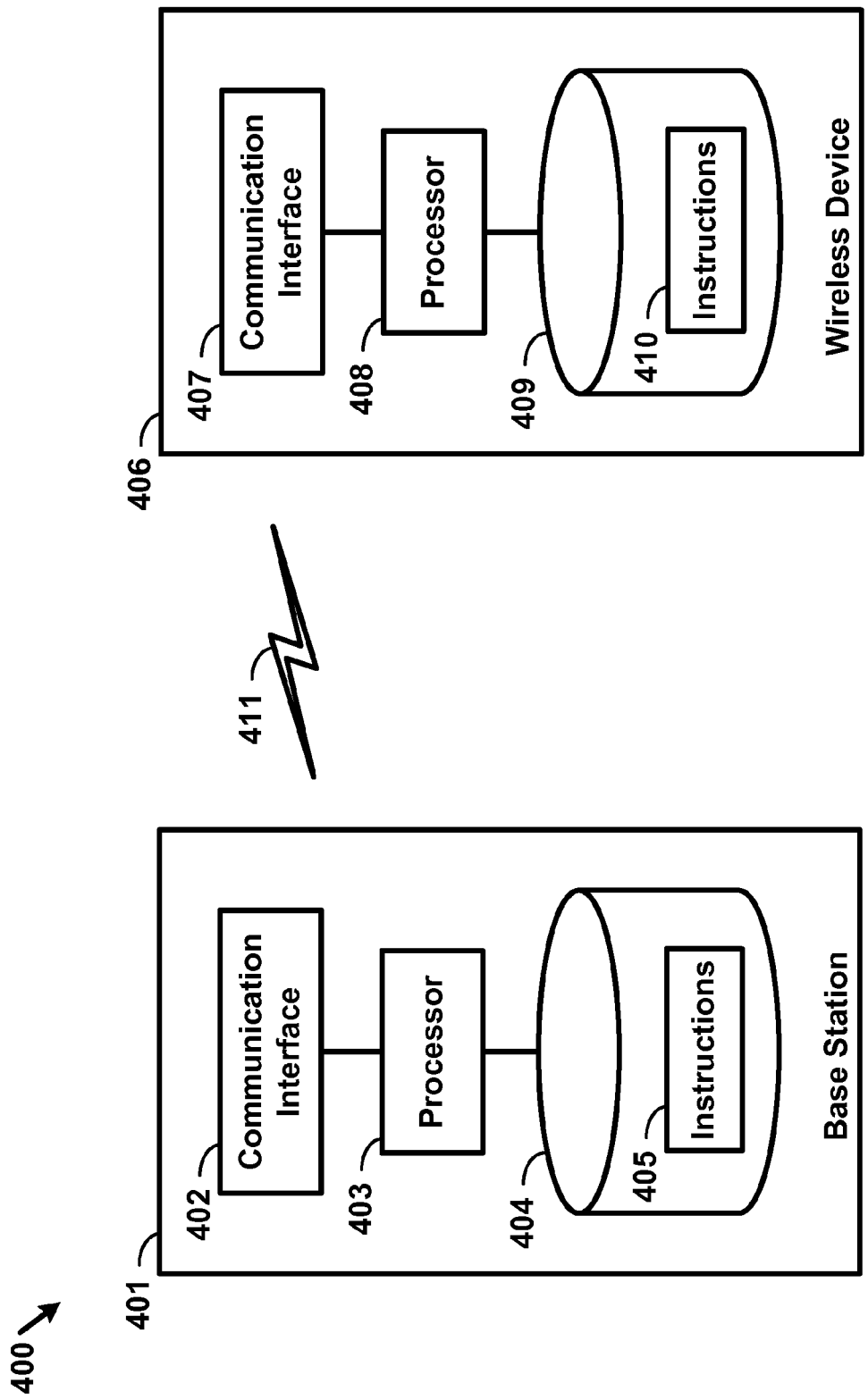
FIG. 4 is a block diagram of a base station and a wireless device as per an aspect of an embodiment of the present invention.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, and FIG. 3. and associated text.

According to some of the various aspects of embodiments, an LTE network may include many base stations, providing a user plane (PDCP: packet data convergence protocol/RLC: radio link control/MAC: media access control/PHY: physical) and control plane (RRC: radio resource control) protocol terminations towards the wireless device. The base station(s) may be interconnected with other base station(s) by means of an X2 interface. The base stations may also be connected by means of an S1 interface to an EPC (Evolved Packet Core). For example, the base stations may be interconnected to the MME (Mobility Management Entity) by means of the S1-MME interface and to the Serving Gateway (S-GW) by means of the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. When carrier aggregation is configured, a wireless device may have one RRC connection with the network. At RRC connection establishment/re-establishment/handover, one serving cell may provide the NAS (non-access stratum) mobility information (e.g. TAI-tracking area identifier), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, is assigned a physical cell ID and a cell index. A carrier (downlink or uplink) belongs to only one cell, the cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. Cell ID may be determined using the synchronization signal transmitted on a downlink carrier. Cell index may be determined using RRC messages. For example, when the specification refers to a first physical cell ID for a first downlink carrier, it may mean the first physical cell ID is for a cell comprising the first downlink carrier. The same concept may apply to, for example, carrier activation. When the specification indicates that a first carrier is activated, it equally means that the cell comprising the first carrier is activated.

Embodiments may be configured to operate as needed. The disclosed mechanism may be performed when certain criteria are met, for example, in wireless device, base station, radio environment, network, a combination of the above, and/or the like. Example criteria may be based, at least in part, on for example, traffic load, initial system set up, packet sizes, traffic characteristics, a combination of the above, and/or the like. When the one or more criteria are met, the example embodiments may be applied. Therefore, it may be possible to implement example embodiments that selectively implement disclosed protocols.

Example embodiments of the invention may enable operation of multiple timing advance groups. Other example embodiments may comprise a non-transitory tangible computer readable media comprising instructions executable by one or more processors to cause operation of multiple timing advance groups. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multiple timing advance groups. The device may include processors, memory, interfaces, and/or the like. Other example embodiments may comprise communication networks comprising devices such as base stations, wireless devices (or user equipment: UE), servers, switches, antennas, and/or the like.

According to some of the various aspects of embodiments, serving cells having an uplink to which the same time alignment (TA) applies may be grouped in a TA group (TAG). Serving cells in one TAG may use the same timing reference. For a given TAG, a user equipment (UE) may use one downlink carrier as the timing reference at a given time. The UE may use a downlink carrier in a TAG as the timing reference for that TAG. For a given TAG, a UE may synchronize uplink subframe and frame transmission timing of the uplink carriers belonging to the same TAG. According to some of the various aspects of embodiments, serving cells having an uplink to which the same TA applies may correspond to the serving cells hosted by the same receiver. A TA group may comprise at least one serving cell with a configured uplink. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). Carriers within the same TA group may use the same TA value and the same timing reference.

Figure 5:
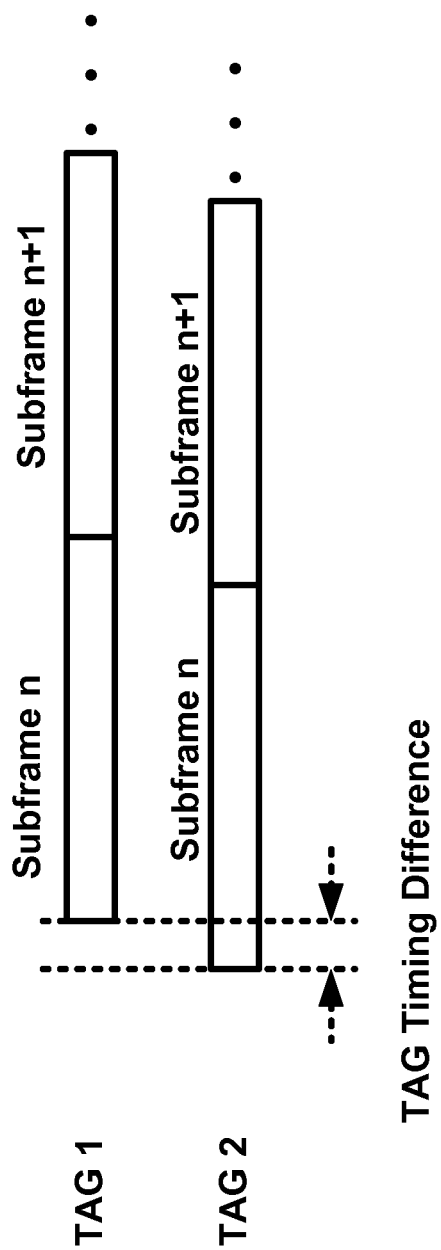
FIG. 5 is a diagram depicting uplink transmission timing of one or more cells in a first timing advance group (TAG) and a second TAG as per an aspect of an embodiment of the present invention.

FIG. 5 is a diagram depicting uplink transmission timing of one or more cells in a first timing advance group (TAG1) and a second TAG (TAG2) as per an aspect of an embodiment of the present invention. TAG1 may include one or more cells, TAG2 may also include one or more cells. TAG timing difference in FIG. 5 may be the difference in UE uplink transmission timing for uplink carriers in TAG1 and TAG2. The timing difference may range between, for example, sub micro-seconds to about 3o micro-seconds.

Figure 7:
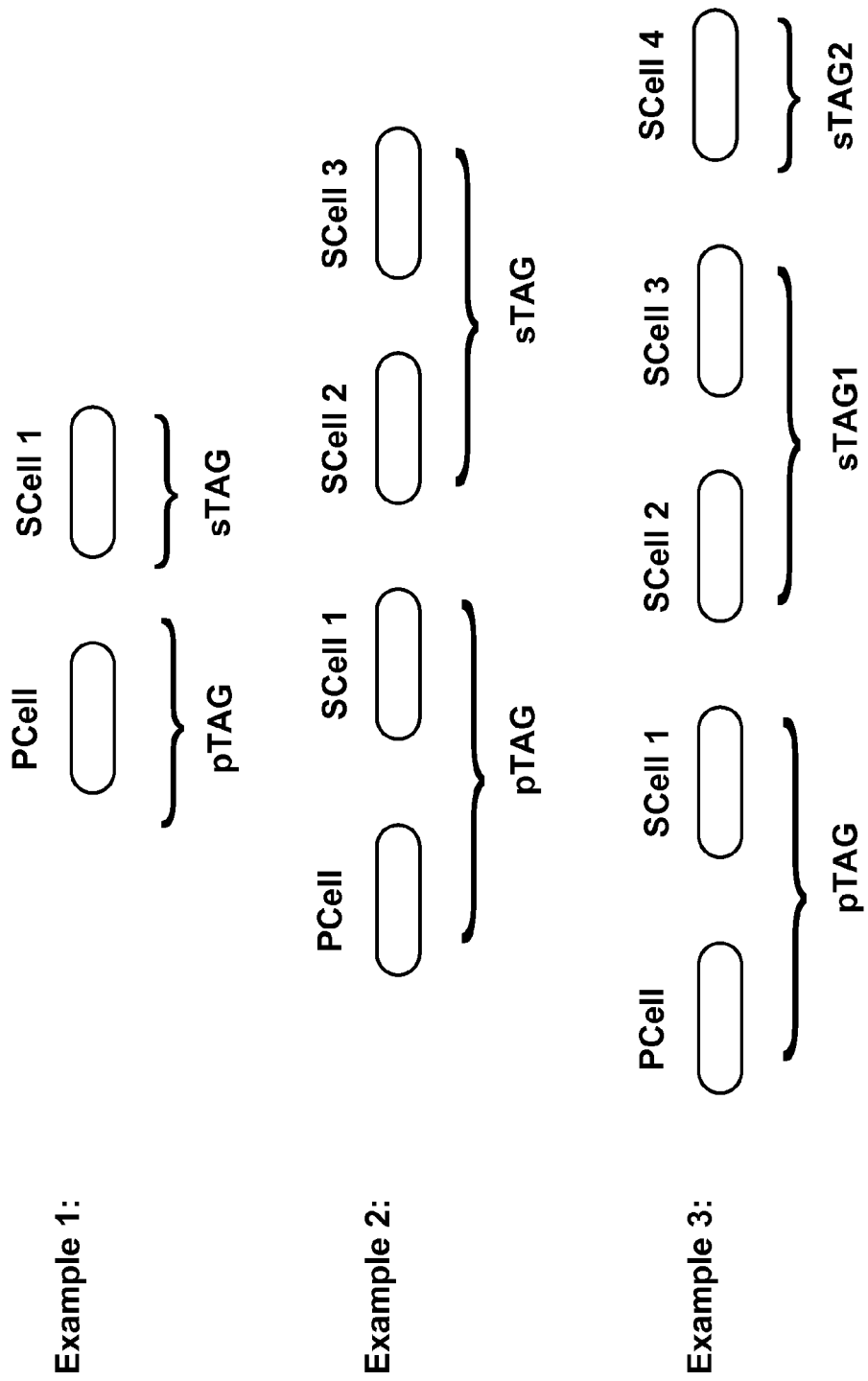
FIG. 7 shows example TAG configurations as per an aspect of an embodiment of the present invention.

FIG. 7 shows example TAG configurations as per an aspect of an embodiment of the present invention. In Example 1, pTAG include PCell, and sTAG includes SCell1. In Example 2, pTAG includes PCell and SCell1, and sTAG includes SCell2 and SCell3. In Example 3, pTAG includes PCell and SCell1, and sTAG1 includes SCell2 and SCell3, and sTAG2 includes SCell4. Up to four TAGs may be supported and other example TAG configurations may also be provided. In many examples of this disclosure, example mechanisms are described for a pTAG and an sTAG. The operation with one example sTAG is described, and the same operation may be applicable to other sTAGs. The example mechanisms may be applied to configurations with multiple sTAGs.

According to some of the various aspects of embodiments, TA maintenance, pathloss reference handling and the timing reference for pTAG may follow LTE release 10 principles. The UE may need to measure downlink pathloss to calculate the uplink transmit power. The pathloss reference may be used for uplink power control and/or transmission of random access preamble(s). A UE may measure downlink pathloss using the signals received on the pathloss reference cell. For SCell(s) in a pTAG, the choice of pathloss reference for cells may be selected from and be limited to the following two options: a) the downlink SCell linked to an uplink SCell using the system information block 2 (SIB2), and b) the downlink pCell. The pathloss reference for SCells in pTAG may be configurable using RRC message(s) as a part of SCell initial configuration and/or reconfiguration. According to some of the various aspects of embodiments, PhysicalConfigDedicatedSCell information element (IE) of an SCell configuration may include the pathloss reference SCell (downlink carrier) for an SCell in pTAG. The downlink SCell linked to an uplink SCell using the system information block 2 (SIB2) may be referred to as the SIB2 linked downlink of the SCell. Different TAGs may operate in different bands. For an uplink carrier in an sTAG, the pathloss reference may be only configurable to the downlink SCell linked to an uplink SCell using the system information block 2 (SIB2) of the SCell.

To obtain initial uplink (UL) time alignment for an sTAG, eNB may initiate an RA procedure. In an sTAG, a UE may use one of any activated SCells from this sTAG as a timing reference cell. In an example embodiment, the timing reference for SCells in an sTAG may be the SIB2 linked downlink of the SCell on which the preamble for the latest RA procedure was sent. There may be one timing reference and one time alignment timer (TAT) per TA group. TAT for TAGs may be configured with different values. When the TAT associated with the pTAG expires: all TATs may be considered as expired, the UE may flush all HARQ buffers of all serving cells, the UE may clear any configured downlink assignment/uplink grants, and the RRC in the UE may release PUCCH/SRS for all configured serving cells. When the pTAG TAT is not running, an sTAG TAT may not be running. When the TAT associated with sTAG expires: a) SRS transmissions may be stopped on the corresponding SCells, b) SRS RRC configuration may be released, c) CSI reporting configuration for the corresponding SCells may be maintained, and/or d) the MAC in the UE may flush the uplink HARQ buffers of the corresponding SCells.

Upon deactivation of the last SCell in an sTAG, the UE may not stop TAT of the sTAG. In an implementation, upon removal of the last SCell in an sTAG, TAT of the TA group may not be running. RA procedures in parallel may not be supported for a UE. If a new RA procedure is requested (either by UE or network) while another RA procedure is already ongoing, it may be up to the UE implementation whether to continue with the ongoing procedure or start with the new procedure. The eNB may initiate the RA procedure via a PDCCH order for an activated SCell. This PDCCH order may be sent on the scheduling cell of this SCell. When cross carrier scheduling is configured for a cell, the scheduling cell may be different than the cell that is employed for preamble transmission, and the PDCCH order may include the SCell index. At least a non-contention based RA procedure may be supported for SCell(s) assigned to sTAG(s).

Figure 6:
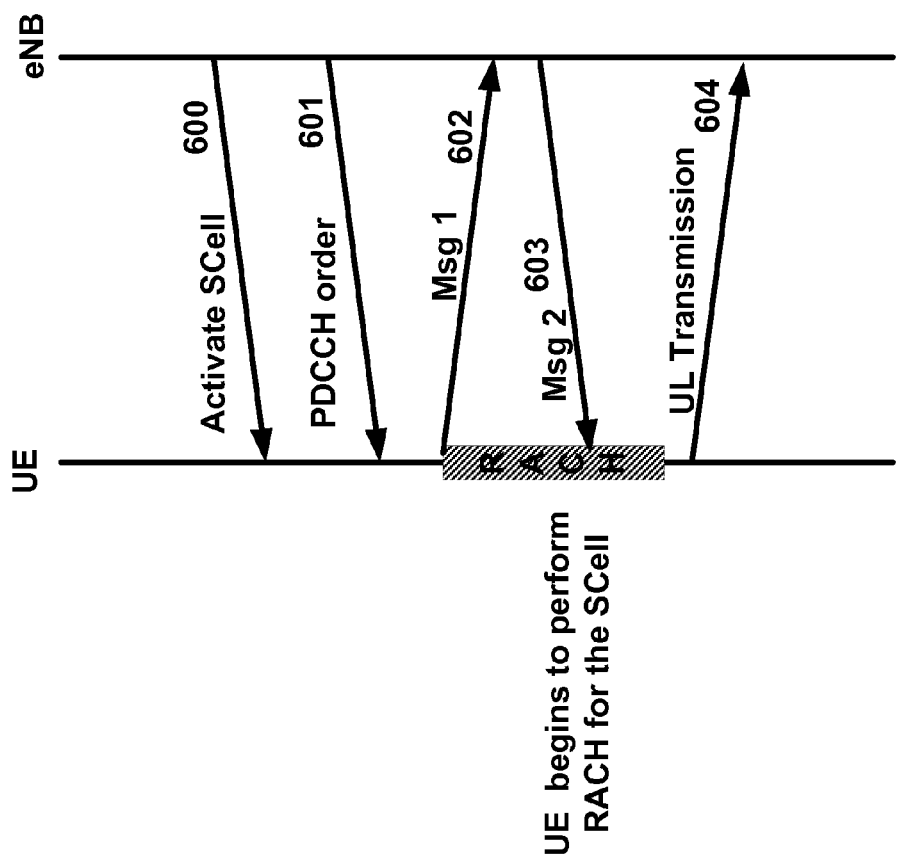
FIG. 6 is an example message flow in a random access process in a secondary TAG as per an aspect of an embodiment of the present invention.

FIG. 6 is an example message flow in a random access process in a secondary TAG as per an aspect of an embodiment of the present invention. eNB transmits an activation command 600 to activate an SCell. A preamble 602 (Msg1) may be sent by a UE in response to the PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on SCell may be addressed to RA-RNTI in PCell common search space (CSS). Uplink packets 604 may be transmitted on the SCell, in which the preamble was transmitted.

According to some of the various aspects of embodiments, initial timing alignment may be achieved through a random access procedure. This may involve the UE transmitting a random access preamble and the eNB responding with an initial TA command NTA (amount of timing advance) within the random access response window. The start of the random access preamble may be aligned with the start of the corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

A base station may communicate with a mix of wireless devices. Wireless devices may support multiple technologies, or multiple releases of the same technology, have some specific capability depending on the wireless device category and/or capability. A base station may comprise multiple sectors. When this disclosure refers to a base station communicating with a plurality of wireless devices, this disclosure may refer to a subset of the total wireless devices in the coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in the coverage area, which perform according to the disclosed methods, and/or the like. There may be many wireless devices in the coverage area that may not comply with the disclosed methods, for example, because those wireless devices perform based on older releases of LTE technology. A time alignment command MAC control element may be a unicast MAC command transmitted to a wireless device.

According to some of the various aspects of various embodiments, the base station or wireless device may group cells into a plurality of cell groups. The term "cell group" may refer to a timing advance group (TAG) or a timing alignment group or a time alignment group. Time alignment command may also be referred to timing advance command. A cell group may include at least one cell. A MAC TA command may correspond to a TAG. A cell group may explicitly or implicitly be identified by a TAG index. Cells in the same band may belong to the same cell group. A first cell's frame timing may be tied to a second cell's frame timing in a TAG. When a time alignment command is received for the TAG, the frame timing of both first cell and second cell may be adjusted. Base station(s) may provide TAG configuration information to the wireless device(s) by RRC configuration message(s).

The mapping of a serving cell to a TAG may be configured by the serving eNB with RRC signaling. The mechanism for TAG configuration and reconfiguration may be based on RRC signaling. According to some of the various aspects of embodiments, when an eNB performs SCell addition configuration, the related TAG configuration may be configured for the SCell. In an example embodiment, eNB may modify the TAG configuration of an SCell by removing (releasing) the SCell and adding (configuring) a new SCell (with the same physical cell ID and frequency) with an updated TAG ID. The new SCell with the updated TAG ID may be initially inactive subsequent to being assigned the updated TAG ID. eNB may activate the updated new SCell and then start scheduling packets on the activated SCell. In an example implementation, it may not be possible to change the TAG associated with an SCell, but rather, the SCell may need to be removed and a new SCell may need to be added with another TAG. For example if there is a need to move an SCell from an sTAG to a pTAG, at least one RRC message, for example, at least one RRC reconfiguration message, may be send to the UE to reconfigure TAG configurations by releasing the SCell and then configuring the SCell as a part of pTAG (when an SCell is added/configured without a TAG index, the SCell is explicitly assigned to pTAG). The PCell may not change its TA group and may always be a member of the pTAG.

An eNB may perform initial configuration based on initial configuration parameters received from a network node (for example a management platform), an initial eNB configuration, a UE location, a UE type, UE CSI feedback, UE uplink transmissions (for example, data, SRS, and/or the like), a combination of the above, and/or the like. For example, initial configuration may be based on UE channel state measurements or received signal timing. For example, depending on the signal strength received from a UE on various SCells downlink carrier or by determination of UE being in a repeater coverage area, or a combination of both, an eNB may determine the initial configuration of sTAGs and membership of SCells to sTAGs.

In an example implementation, the TA value of a serving cell may change, for example due to UE's mobility from a macro-cell to a repeater or an RRH (remote radio head) coverage area. The signal delay for that SCell may become different from the original value and different from other serving cells in the same TAG. In this scenario, eNB may re-configure this TA-changed serving cell to another existing TAG. Or alternatively, the eNB may create a new TAG for the SCell based on the updated TA value. The TA value may be derived, for example, through eNB measurement(s) of signal reception timing, a RA mechanism, or other standard or proprietary processes. An eNB may realize that the TA value of a serving cell is no longer consistent with its current TAG. There may be many other scenarios which require eNB to reconfigure TAGs. During reconfiguration, the eNB may need to move the reference SCell belonging to an sTAG to another TAG. In this scenario, the sTAG would require a new reference SCell. In an example embodiment, the UE may select an active SCell in the sTAG as the reference timing SCell.

eNB may consider UE's capability in configuring multiple TAGs for a UE. UE may be configured with a configuration that is compatible with UE capability. Multiple TAG capability may be an optional feature and per band combination Multiple TAG capability may be introduced. UE may transmit its multiple TAG capability to eNB via an RRC message and eNB may consider UE capability in configuring TAG configuration(s).

The purpose of an RRC connection reconfiguration procedure may be to modify an RRC connection, (e.g. to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

The parameters related to SCell random access channel may be common to all UEs. For example PRACH configuration (RACH resources, configuration parameters, RAR window) for the SCell may be common to UEs. RACH resource parameters may include prach-configuration index, and/or prach-frequency offset. SCell RACH common configuration parameters may also include power: power ramping parameter(s) for preamble transmission; and max number of preamble transmission parameter. It is more efficient to use common parameters for RACH configuration, since different UEs will share the same random access channel.

eNB may transmit at least one RRC message to configure PCell, SCell(s) and RACH, and TAG configuration parameters. MAC-MainConfig may include a timeAlignmentTimerDedicated IE to indicate time alignment timer value for the pTAG. MAC-MainConfig may further include an IE including a sequence of at least one (sTAG ID, and TAT value) to configure time alignment timer values for sTAGs. In an example, a first RRC message may configure TAT value for pTAG, a second RRC message may configure TAT value for sTAG1, and a third RRC message may configure TAT value for sTAG2. There is no need to include all the TAT configurations in a single RRC message. In an example embodiment they may be included in one or two RRC messages. The IE including a sequence of at least one (sTAG ID, and TAT) value may also be used to update the TAT value of an existing sTAG to an updated TAT value. The at least one RRC message may also include sCellToAddModList including at least one SCell configuration parameters. The radioResourceConfigDedicatedSCell (dedicated radio configuration IEs) in sCellToAddModList may include an SCell MAC configuration comprising TAG ID for the corresponding SCell added or modified. The radioResourceConfigDedicatedSCell may also include pathloss reference configuration for an SCell. If TAG ID is not included in SCell configuration, the SCell is assigned to the pTAG. In other word, a TAG ID may not be included in radioResourceConfigDedicatedSCell for SCells assigned to pTAG. The radioResourceConfigCommonSCell (common radio configuration IEs) in sCellToAddModList may include RACH resource configuration parameters, preamble transmission power control parameters, and other preamble transmission parameter(s). At the least one RRC message configures PCell, SCell, RACH resources, and/or SRS transmissions and may assign each SCell to a TAG (implicitly for pTAG or explicitly for sTAG). PCell is always assigned to the pTAG.

According to some of the various aspects of embodiments, a base station may transmit at least one control message to a wireless device in a plurality of wireless devices. The at least one control message is for example, RRC connection reconfiguration message, RRC connection establishment message, RRC connection re-establishment message, and/or other control messages configuring or reconfiguring radio interface, and/or the like. The at least one control message may be configured to cause, in the wireless device, configuration of at least: I) a plurality of cells. Each cell may comprise a downlink carrier and zero or one uplink carrier. The configuration may assign a cell group index to a cell in the plurality of cells. The cell group index may identify one of a plurality of cell groups. A cell group in the plurality of cell groups may comprise a subset of the plurality of cells. The subset may comprise a reference cell with a reference downlink carrier and a reference uplink carrier. Uplink transmissions by the wireless device in the cell group may employ the reference cell (the primary cell in pTAG and a secondary cell in an sTAG). The wireless device may employ a synchronization signal transmitted on the reference downlink carrier as timing reference to determine a timing of the uplink transmissions. The synchronization signal for example may be a) primary/secondary synchronization signal, b) reference signal(s), and/or c) a combination of a) and b). II) a time alignment timer for each cell group in the plurality of cell groups; and/or III) an activation timer for each configured secondary cell.

The base station may transmit a plurality of timing advance commands. Each timing advance command may comprise: a time adjustment value, and a cell group index. A time alignment timer may start or may restart when the wireless device receives a timing advance command to adjust uplink transmission timing on a cell group identified by the cell group index. A cell group may be considered out-of-sync, by the wireless device, when the associated time alignment timer expires or is not running. The cell group may be considered in-sync when the associated time alignment timer is running.

The timing advance command may causes substantial alignment of reception timing of uplink signals in frames and subframes of all activated uplink carriers in the cell group at the base station. The time alignment timer value may be configured as one of a finite set of predetermined values. For example, the finite set of predetermined values may be eight. Each time alignment timer value may be encoded employing three bits. TAG TAT may be a dedicated time alignment timer value and is transmitted by the base station to the wireless device. TAG TAT may be configured to cause configuration of time alignment timer value for each time alignment group. The IE TAG TAT may be used to control how long the UE is considered uplink time aligned. It corresponds to the timer for time alignment for each cell group. Its value may be in number of sub-frames. For example, value sf500 corresponds to 500 sub-frames, sf750 corresponds to 750 sub-frames and so on. An uplink time alignment is common for all serving cells belonging to the same cell group. In an example embodiment, the IE TAG TAT may be defined as: TAG TAT:: =SEQUENCE{TAG ID, ENUMERATED {sf500, sf750, sf1280, sf1920, sf2560, sf5120, sf10240, infinity}}. Time alignment timer for pTAG may be indicated in a separate IE and may not be included in the sequence.

In an example, TimeAlignmentTimerDedicated IE may be sf500, and then TAG TAT may be {1, sf500; 2, sf2560; 3, sf500}. In the example, time alignment timer for the pTAG is configured separately and is not included in the sequence. In the examples, TAG0 (pTAG) time alignment timer value is 500 subframes (500 m-sec), TAG1 (sTAG) time alignment timer value is 500 subframes, TAG2 time alignment timer value is 2560 subframes, and TAG3 time alignment timer value is 500 subframes. This is for example purposes only. In this example a TAG may take one of 8 predefined values. In a different embodiment, the enumerated values could take other values.

FIG. 6 is an example message flow in a random access process in a TAG as per an aspect of an embodiment. A preamble 602 may be sent by a UE in response to the PDCCH order 601 on an SCell belonging to an sTAG. Preamble transmission for SCells may be controlled by the network using PDCCH format 1A (control command). Msg2 message 603 (also called a random access response: RAR) in response to the preamble transmission on SCell may be addressed to RA-RNTI in PCell common search space (CSS). Uplink packets 604 may be transmitted on the SCell in which the preamble was transmitted.

In one of the various implementations, RAR may include an uplink grant. In LTE release 10, a RAR uplink grant may be for the primary cell by default. In order to allow more flexibility, the uplink grant in RAR in multiple TAG configuration may need to allow transmission of an uplink grant for a secondary cell. In one embodiment, this could be accomplished by including a cell index in the RAR uplink grant. In order to allow more flexibility in the uplink grant, and at the same time reduce overhead, a new mechanism may be implemented. Including an SCell index in a RAR uplink grant may increase signaling overhead. The SCell index in the uplink grant may not be transmitted in the uplink grant in RAR and the uplink grant contained in the RAR may be applicable to the cell where the preamble was sent by default. This may reduce the signaling overhead.

In LTE release 10, the timing advance command (TAC) in a RAR is applied to the pCell and to the sCells synchronized with the pCell. In order to allow more flexibility, the TAC in a RAR in a multiple TAG configuration may need to be applied to secondary cell groups. In one embodiment, this could be accomplished by including a cell group index in the RAR TAC. In order to allow more flexibility in TAC, and at the same time reduce overhead, a new mechanism may be implemented. Including a cell group index in a RAR TAC may increase signaling overhead. The cell group index in the TAC may not be transmitted in the TAC in a RAR. The TAC contained in the RAR may be applicable to the cell group where the preamble was sent by default. This may reduce the signaling overhead. For example, if the random access preamble is sent on a first secondary cell of a first secondary cell group. The TAC in a RAR may be applicable to the first secondary cell group. The wireless device may apply the TAC in a RAR to all activated secondary cells in the first secondary cell group.

According to some of the various aspects of embodiments, a RAPID may be included in Msg2 603 to address possible preamble misdetection by the eNB. UE may compare the RAPID in Msg2 603 with the transmitted preamble ID to verify the validity of the Msg2 603 and to verify possible preamble misdetection by the eNB. A RAR may always be transmitted on a PCell independent of the cell used for preamble transmission (sCell or pCell). UE may monitor and receive a RAR with a specific RA-RNTI associated with the random access channel used for random access preamble transmission. The specific RA-RNTI may be defined based on the subframe (t_id) and frequency index of the physical random access channel (f_id) that is used for random access preamble transmission.

If no Random Access Response is received within the RA Response window, or if none of all received Random Access Responses contain a Random Access Preamble identifier corresponding to the transmitted Random Access Preamble, the Random Access Response reception may be considered not successful and the UE may increment the PREAMBLE_TRANSMISSION_COUNTER by 1. If the PREAMBLE_TRANSMISSION_COUNTER=preambleTransMax+1 and if the Random Access Preamble is transmitted on the PCell, the UE may indicate a Random Access problem to upper layers. If the PREAMBLE_TRANSMISSION_COUNTER=preambleTransMax+1 and if the Random Access Preamble is transmitted on an SCell, the UE may consider the Random Access procedure unsuccessfully completed.

Figure 8:
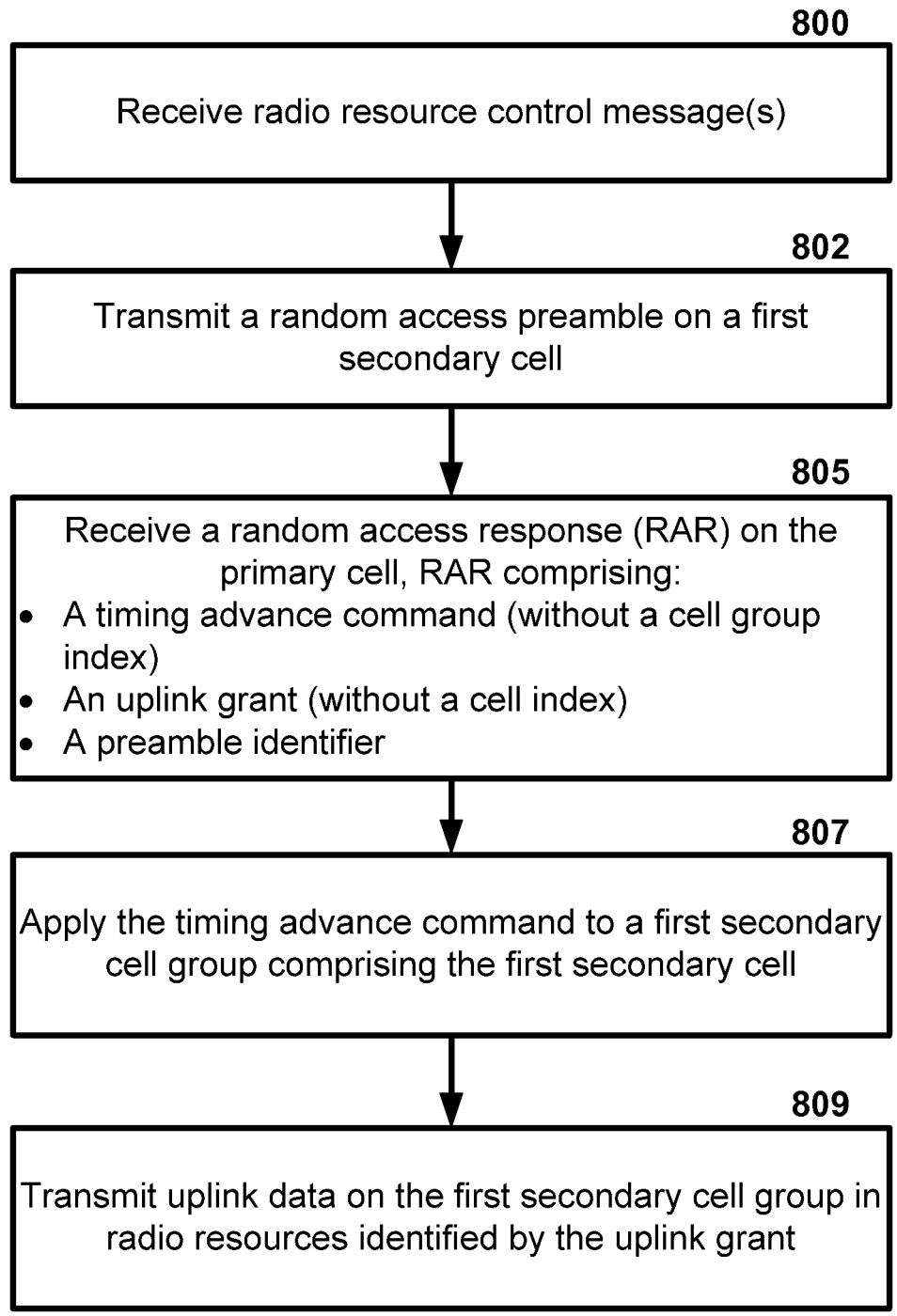
FIG. 8 is an example flow diagram illustrating a wireless device random access process as per an aspect of an embodiment of the present invention.

FIG. 8 is an example flow diagram illustrating a wireless device random access process as per an aspect of an embodiment. According to some of the various aspects of embodiments, a wireless device may be configured to communicate employing a plurality of cells. The wireless device may receive at least one control message from a base station at block 800. The at least one control message may cause in the wireless device: configuration of a primary cell and at least one secondary cell, and/or assignment of each of the at least one secondary cell to a cell group. The assignment may be done implicitly or explicitly as described in this disclosure. A cell group may be in a plurality of cell groups. The plurality of cell groups may comprise a primary cell group and at least one secondary cell group.

According to some of the various aspects of embodiments, the primary cell group may comprise a first subset of the plurality of cells. The first subset may comprise the primary cell. Uplink transmissions by the wireless device in the primary cell group may employ the primary cell as a primary timing reference cell. Uplink transmissions by the wireless device in the primary cell group may employ a first synchronization signal transmitted on the primary cell as a primary timing reference. A secondary cell group in the at least one secondary cell group may comprise a second subset of the at least one secondary cell. Uplink transmissions in the secondary cell group may employ an activated secondary cell as a secondary timing reference cell. Uplink transmissions in the secondary cell group may employ a second synchronization signal on the activated secondary cell in the secondary cell group as a secondary timing reference.

According to some of the various aspects of embodiments, the wireless device may transmit a random access preamble on random access resources of a first secondary cell in the at least one secondary cell at block 802. The wireless device may transmit the random access preamble in response to receiving a control command (PDCCH order) from the base station. The first secondary cell may be the same as the activated secondary cell or may be a different secondary cell in the secondary cell group.

The wireless device may receive a random access response (at block 805) on the primary cell of the primary cell group in response to the random access preamble transmission. The random access response may comprise: a timing advance command, an uplink grant, and/or a preamble identifier identifying the random access preamble. The wireless device may apply the timing advance command only to uplink transmission timing of a first secondary cell group comprising the first secondary cell at block 807. The random access response does not comprise an index identifying the first secondary cell group. The wireless device applies the TAC to the cell group comprising the cell that was employed for preamble transmission. This may reduce signaling overhead by eliminating inclusion of cell group index in random access response. Legacy random access response message format may be employed for when multiple cell groups are configured.

The wireless device may transmit uplink data on the first secondary cell in radio resources identified in the uplink grant at block 809. The random access response does not comprise an index identifying the first secondary cell. The wireless device applies the uplink grant to the cell that was employed for preamble transmission. This may reduce signaling overhead by eliminating inclusion of a cell index in the random access response. Legacy random access response message format may be employed for when multiple cell groups are configured.

According to some of the various aspects of embodiments, after random access preamble transmission, the wireless device may monitor a downlink control channel on the primary cell for random access responses identified by an identifier (RA-RNTI). The monitoring may performed within a time frame. The time frame may start at a subframe that contains the end of transmission of the random access preamble plus k subframes (k an integer greater than one, for example k=3). The time frame may have a duration smaller than or equal to a random access response window. The identifier of the random access response (RA-RNTI) may depend, at least in part, on: a subframe index (t_id) associated with a subframe in which the random access preamble is transmitted, and a frequency index (f_id) associated with a frequency offset in the random access resources employed for the random access preamble transmission. For example, RA-RNTI may be calculated using RA-RNTI=1+t_id+10*f_id. The random access response corresponds to the random access preamble transmission employing an identifier of the random access response and a preamble identifier identifying the random access preamble.

The wireless device may receive an activation command to activate the first secondary cell in the wireless device prior to receiving the control command. The control command may comprise an index identifying the first secondary cell only if the control command is not transmitted on the first secondary cell. The wireless device may transmit the random access preamble in the random access resources of the first secondary cell.

The control command may be received on a scheduling cell of the first secondary cell. The control command may comprise a mask index and a preamble identifier identifying the random access preamble. The wireless device may be assigned, by the configuration, a plurality of media access control dedicated parameters. The plurality of media access control dedicated parameters may comprise a plurality of time alignment timer values. Each time alignment timer value may be associated with a unique cell group in the wireless device.

Figure 9:
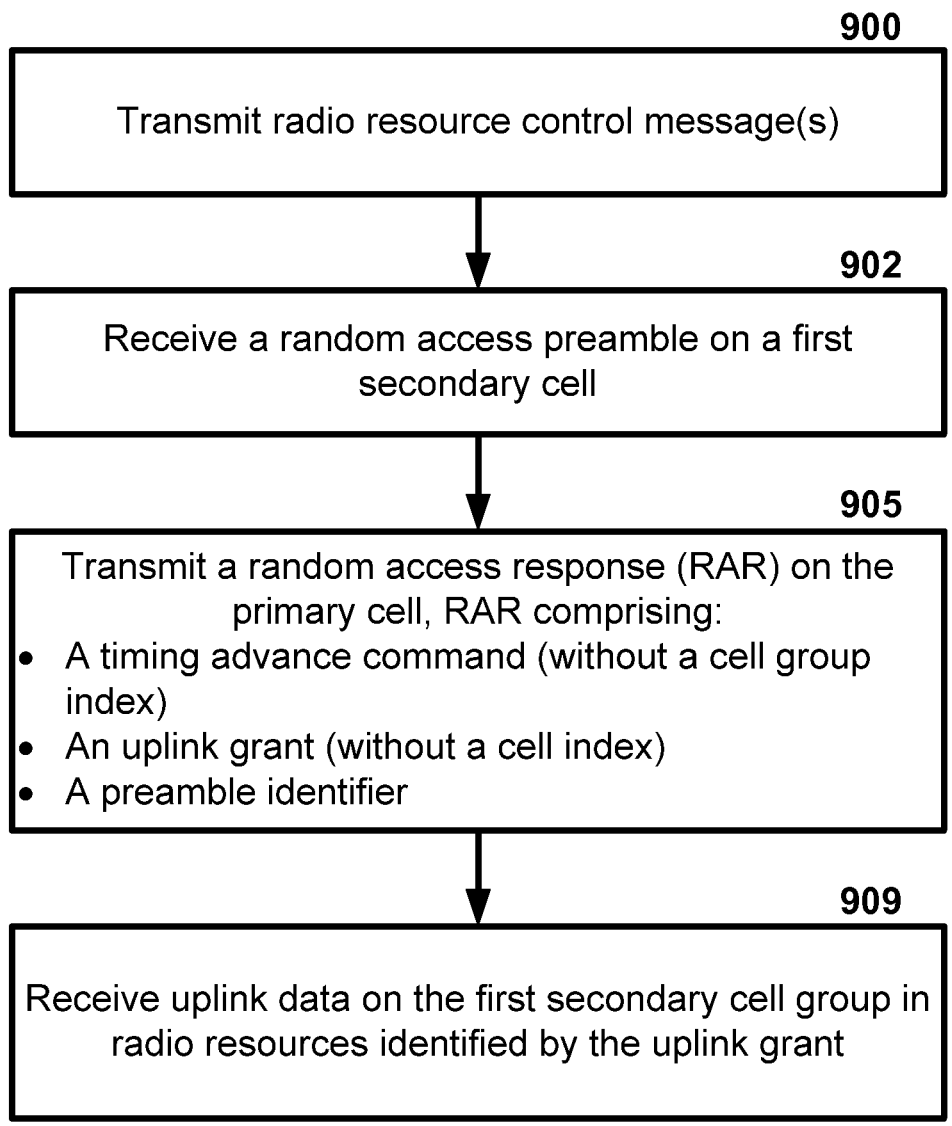
FIG. 9 is an example flow diagram illustrating a base station random access process as per an aspect of an embodiment of the present invention.

FIG. 9 is an example flow diagram illustrating a base station random access process as per an aspect of an embodiment. According to some of the various aspects of embodiments, a base station may comprise one or more communication interfaces, one or more processors, and memory storing instructions that, when executed, cause the base station to perform certain tasks. The base station may transmit at least one control message to a wireless device at block 900. The at least one control message may be configured to cause in the wireless device configuration of a plurality of cells and assignment of each of the at least one secondary cell to a cell group in a plurality of cell groups. The plurality of cells may comprise a primary cell and at least one secondary cell. The at least one control message may be configured to further cause in the wireless device configuration of a time alignment timer for each of the plurality of cell groups. The time alignment timer may start or restart in response to the wireless device receiving a timing advance command to adjust uplink transmission timing of a commanded cell group in the plurality of cell groups. The at least one control message may comprise a plurality of common parameters for the first secondary cell. The plurality of common parameters may comprise: a plurality of random access resource parameters identifying the random access resources, and a plurality of power control parameters.

The plurality of cell groups may comprise a primary cell group and at least one secondary cell group. The primary cell group may comprise a first subset of the plurality of cells. The first subset may comprise the primary cell. A secondary cell group in the at least one secondary cell group may comprise a second subset of the at least one secondary cell. The base station may transmit a control command configured to cause transmission of a random access preamble on random access resources of a first secondary cell in the at least one secondary cell. The base station may receive the random access preamble from the wireless device at block 902. The base station may transmit a random access response corresponding to the random access preamble reception on the primary cell of the primary cell group at block 905. The random access response may comprise a timing advance command and an uplink grant. The base station may receive uplink data from the wireless device on the first secondary cell in radio resources identified in the uplink grant at block 909. The base station may intend the uplink grant for the first secondary cell without including the first secondary cell index in the random access response. The timing advance command transmitted by the base station may be configured to cause substantial alignment of reception timing of uplink signals in frames and subframes of a first secondary cell group comprising the first secondary cell. The base station may intend the timing advance command for the first secondary cell group comprising the first secondary cell without including the first secondary cell group index in the random access response. The random access response may not comprise an index identifying the first secondary cell group. The random access response may not comprise an index identifying the first secondary cell.

According to some of the various aspects of embodiments, upon receiving UE's preamble, the eNB may transmit Msg2 603 RAR in the Msg2 603 window. The UE may receive a Msg2 603 RAR during the Msg2 603 window; if the UE receives the RAR successfully, the UE may consider RA successful, otherwise the UE may retransmit a preamble (if preamble retransmission is allowed). If preamble retransmission is not allowed or a maximum number of retransmissions is received, the UE may not retransmit the preamble. The retransmission window size may be configured by radio resource control messages. The retransmission window size may be configured for a pCell. A RAR window size for a random access process on secondary cells may employ the window size configured for the primary cell. This process may reduce flexibility in configuring different random access window sizes for random access processes of a primary cell and secondary cell(s). This may reduce signaling overhead. With this configuration, a UE may not need to store and/or maintain multiple random access window size values, and the same value may apply to all random access processes. A RAR window size may be configured as a common parameter. Common parameters for a pCell may have the same value for the primary cell of different wireless devices.

Various RAR window sizes may be supported. RAR window sizes of (2, 3, 4, 5, 6, 7, 8, or 10 ms) may be configured. A single RAR window size may be supported by the UE and eNB, and the same RAR may be used regardless of which cell is employed for carrying a random access process. This may reduce flexibility in configuring multiple RAR window times for different cells in sTAG and pTAG. The RAR window may be configured considering the maximum allowed number of retransmissions for the random access message.

According to some of the various aspects of embodiments, random access channel common configuration parameters for a pCell may comprise the following parameters: power ramping step, preamble initial received target power, maximum preamble transmission, random access response window size, and/or the like. Random access channel common configuration parameters for an sCell may comprise the following parameters: power ramping step, preamble initial received target power, maximum preamble transmission, and/or the like. Other parameters may be included in common configuration parameters. As shown in the example, secondary cells may not be configured with a random access response window size. The value of a random access response window size configured for the pCell may apply for random access processes for all cells with a configured random access resource. The associated functionality in the random access process may be performed independently for each cell, but all random access functionalities may employ the same window value. In an example embodiment, random access processes on an sCell may employ the random access response window size configured for the primary cell.

Figure 10:
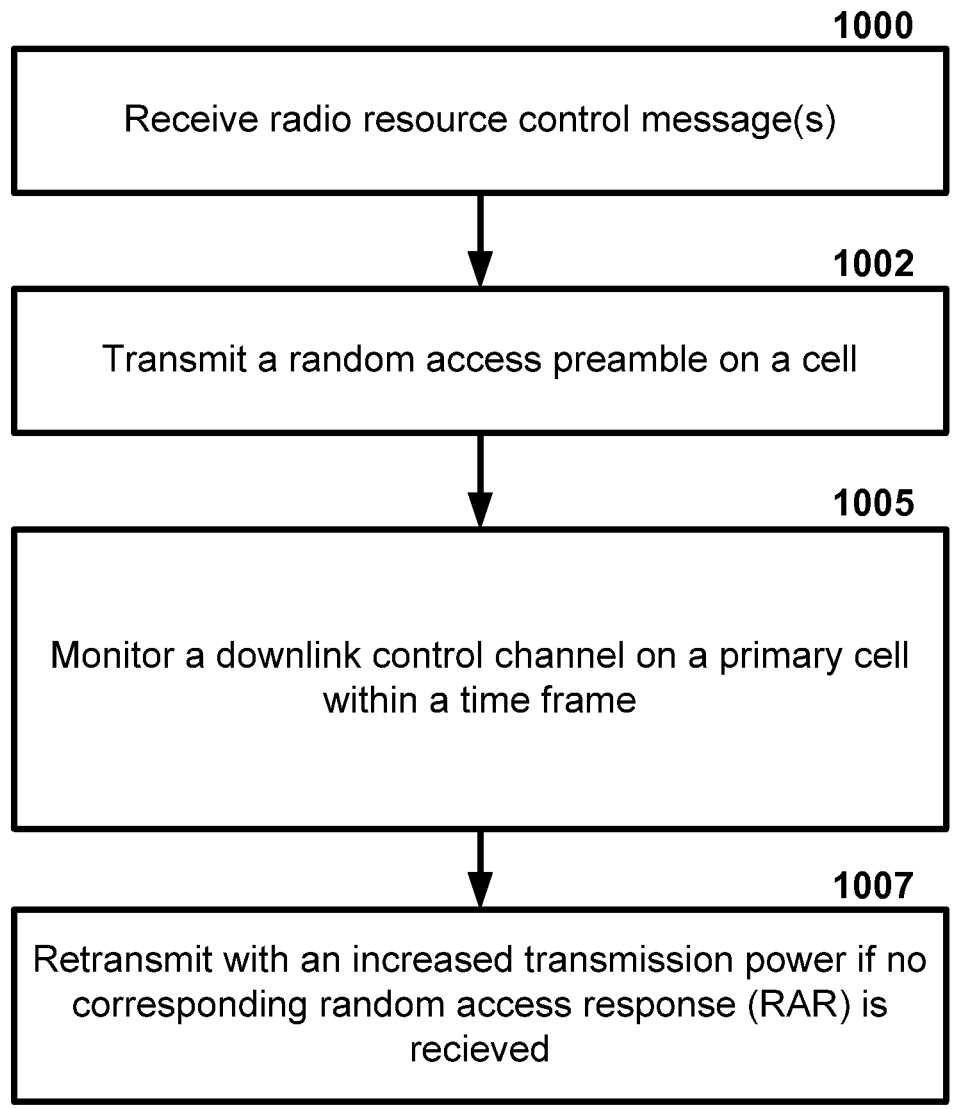
FIG. 10 is an example flow diagram illustrating a random access process in a wireless device as per an aspect of an embodiment of the present invention.

FIG. 10 is an example flow diagram illustrating a random access process in a wireless device as per an aspect of an embodiment. According to some of the various aspects of embodiments, a wireless device may be configured to communicate employing a plurality of cells. The wireless device may receive at least one control message from a base station at block 1000. The at least one control message may cause in the wireless device configuration of a primary cell and at least one secondary cell in the plurality of cells. The at least one control message may cause in the wireless device assignment of each of the at least one secondary cell to a cell group in a plurality of cell groups. The plurality of cell groups may comprise a primary cell group and a secondary cell group. The primary cell group may comprise a first subset of the plurality of cells. The first subset may comprise the primary cell. The secondary cell group may comprise a second subset of the at least one secondary cell. The at least one control message may comprise a primary random access response window parameter for the primary cell and/or a power ramping step value for each cell in a first plurality of cells having configured random access resources. The at least one control message may not comprise a random access response window for secondary cells with configured random access resources.

According to some of the various aspects of embodiments, the wireless device may transmit a random access preamble with an initial transmission power on random access resources of a cell in the first plurality of cells at block 1002. The random access preamble transmission may be in response to receiving a control command (PDCCH order) from the base station. The wireless device may monitor a downlink control channel (PDCCH) on the primary cell for the corresponding random access response at block 1005. The wireless device may monitor the PDCCH common search space for a PDCCH packet identified by a RA-RNTI corresponding to the random access preamble transmission. PDCCH packet with RA-RNTI comprises scheduling information of random access response(s) transmitted in PDSCH. Random access response(s) with the RA-RATI are received and decoded by the wireless device. The wireless device then looks for a corresponding random access response comprising the transmitted random access preamble. If the wireless device does not find the corresponding random access response, the wireless device continues monitoring the PDCCH common search space.

The monitoring for the corresponding random access response may be performed within a time frame. The time frame may start at a subframe that contains the end of transmission of the random access preamble plus k subframes. k may be an integer greater than one (for example, k=3) and have the same value regardless of which cell in the first plurality of cells is employed for transmission of the random access preamble. The time frame may have duration smaller than or equal to the primary random access response window regardless of which cell in the first plurality of cells is employed for transmission of the random access preamble. The wireless device may retransmit, with an increased transmission power, the random access preamble on the random access resources if no corresponding random access response is received within the time frame at block 1007. The increased transmission power may depend, at least in part, on the power ramping step value corresponding to the cell in the first plurality of cells.

According to some of the various aspects of embodiments, uplink transmissions by the wireless device in the primary cell group may employ the primary cell as a primary timing reference cell. Uplink transmissions by the wireless device in the primary cell group may employ a first synchronization signal transmitted on the primary cell as a primary timing reference. Uplink transmissions in the secondary cell group may employ an activated secondary cell in the secondary cell group as a secondary timing reference cell. Uplink transmissions in the secondary cell group may employ a second synchronization signal on an activated secondary cell in the secondary cell group as a secondary timing reference.

According to some of the various aspects of embodiments, the corresponding random access response may comprise a timing advance command, an uplink grant, and a preamble identifier identifying the random access preamble. The wireless device may apply the timing advance command to uplink transmission timing of a cell group comprising the cell. The wireless device may transmit uplink data on the cell in radio resources identified in the uplink grant. The random access response may not comprise an index identifying a cell group comprising the cell. The random access response may not comprise may not comprise an index identifying the cell. An identifier of the random access response (RA-RNTI) may depend, at least in part, on a subframe index associated with a subframe in which the random access preamble is transmitted (t_id) and a frequency index associated with a frequency offset in the random access resources employed for transmission of the random access preamble (f_id). According to some of the various aspects of embodiments, the random access preamble may be transmitted only one time if the corresponding random access response is received after the first transmission of the random access preamble.

In a random access process in a secondary cell group, the wireless device may repeatedly transmit the random access preamble until the corresponding random access response is received, or a first predetermined number of transmissions is reached. If the first predetermined number of transmissions is reached without receiving the corresponding random access response and if the cell is in the secondary cell group, the wireless device may stop transmission of the random access preamble, and may keep a connection with the base station active. Keeping the connection with the base station active implies that the device may remain in RRC connected state.

In a random access process in the primary cell group The wireless device may repeatedly transmit the random access preamble until the corresponding random access response is received, or a second predetermined number of transmissions is reached. If the second predetermined number of transmissions is reached without receiving the corresponding random access response and if the cell is in the primary cell group, the wireless device may indicate a random access problem to a radio resource control layer in the wireless device, and the radio resource control layer may determine a radio link failure.

According to some of the various aspects of embodiments, the at least one control message may comprise a plurality of media access control dedicated parameters. The plurality of media access control dedicated parameters may comprise a plurality of time alignment timer values. Each time alignment timer value may be associated with a unique cell group in the wireless device. The at least one control message may further cause the wireless device configuration of a time alignment timer for each of the plurality of cell groups. The time alignment timer may start or restart in response to the wireless device receiving a timing advance command to adjust uplink transmission timing of a commanded cell group in the plurality of cell groups. The at least one control message may comprise a plurality of common parameters for the cell. The plurality of common parameters may comprise a plurality of random access resource parameters identifying the random access resources.

According to some of the various aspects of embodiments, an eNB in release 11 or above may support configurations including multiple TAGs. In example embodiments, different methods for updating TAG configurations may be presented. A UE may not be required to provide additional assistant information for managing TAGs. An eNB may detect the need for an SCell TAG change and determine the correct TAG for an SCell based on the UE uplink transmissions (for example PUSCH and/or SRS) or RACH preamble transmissions. In some scenarios, an eNB may need to initiate a random access procedure to detect the need for a TAG change or determine the proper TAG for a given SCell. This scenario may happen, for example, when a new SCell is being configured or due to UE mobility to a repeater coverage area. In some other scenarios, an eNB may realize the proper TAG for a given SCell based on normal uplink transmissions (for example PUSCH and/or SRS). RRC signaling may be used to associate an SCell with a TAG.

The sTAG change procedure may require special attention, because some implementations may require a random access process to determine a proper TAG for an SCell. In some other scenarios, an eNB may desire to change a TAG configuration for one or more TAGs. These processes are new to R.11 LTE, since prior releases did not support multiple TAGs in the network. An efficient method should be introduced for TAG reconfiguration and timing reference SCell modifications. Disclosed methods may reduce or eliminate unintended consequences and reduce possible unknown situations and reduce interference due to timing misalignment.

There are many possible scenarios which might lead to a TAG change. An eNB may detect the need for an SCell TAG change and determine the correct TAG based on the normal UL transmission. In an example embodiment, an eNB may detect the need for an SCell TAG change by initiating an RA process on the concerned SCell. An eNB may also determine an SCell TAG change according to many other parameters, for example, UE location, repeater related signaling, and/or the like. An SCell may be re-grouped to an existing TAG with a valid TA value (TAG in-sync) or the SCell may be included in a newly configured TAG. In some other scenarios, when a new SCell is configured, RRC configuration messages may configure a new TAG for the new SCell. In another example, when the UE moves out of the coverage area of a repeater, the SCell(s) belonging to sTAG may be moved to the pTAG.

According to some of the various aspects of embodiments, a scenario may be considered wherein no new TAG is configured and the configuration of TAGs is modified. For example, on detecting that an SCell is no longer suitable for the current TAG, based on the normal UL transmission (PUSCH, SRS) or preamble transmission, the eNB may initiate the TAG change procedure. Then the eNB may change the concerned SCell TAG via RRC signaling. An eNB may first release the SCell and then add the concerned SCell to an existing TAG. This may be performed via one or more RRC signaling messages. The SCell may be initially deactivated when it is configured with an existing TAG.

According to some of the various aspects of embodiments, a scenario may be considered wherein an eNB may not know the TA value for the concerned SCell and an eNB may not be able to determine if the concerned SCell may be assigned to an existing TAG or a new TAG. This might be, for example, because the concerned SCell is a newly configured SCell or is an existing SCell for which a TA may not be determined based on uplink transmissions. When timing alignment of the concerned SCell does not match its existing sTAG, the concerned SCell may require TAG reconfiguration.

An eNB may configure a new sTAG for the concerned SCell, and then trigger an RA on the concerned SCell to determine its timing alignment value. The eNB may determine which TAG is the most suitable TAG for the concerned SCell. The eNB may reconfigure the concerned SCell and move the concerned SCell to a different TAG based on its TA value or keep the concerned SCell and newly added sTAG configuration. The eNB may need to detect the need for a TAG change and determine the correct TAG based on the TA value of the concerned SCell by triggering an RA procedure on the SCell. The eNB may not transmit a RAR if the eNB desires to change the TAG of the SCell. This process of TAG reconfiguration may require transmitting at least one RRC reconfiguration message.

If an eNB suspects that the concerned SCell is no longer suitable for the current TAG based on the received signal timing of UE UL transmissions (for example PUSCH, and/or SRS transmission), the eNB may initiate the TAG change procedure. The eNB may trigger an RA procedure on the concerned SCell to obtain the TA value of this concerned SCell and may change its TAG (if needed) via the RRC signalling. The eNB may release the concerned SCell and add it to a suitable or new TAG. In this case, UL data and SRS transmission may be initially stopped on the concerned SCell where a TA group is set to the new TAG because the SCell is deactivated when the SCell is added to the new TAG. In an example scenario, a TA timer of the new TA group may not be running. An RA procedure may be implemented to acquire a new TA value and to start a new TA timer for the usage of concerned UL SCell in the new TA group. If the concerned SCell was a reference SCell in a current sTAG and is moved out of a current sTAG, then the UE may select another active SCell in the current sTAG as the timing reference in the current sTAG.

According to some of the various aspects of embodiments, a cell group index may be configured as a dedicated radio resource configuration parameter for an sCell. The dedicated radio resource configuration parameters for an sCell may be configured as a part of an SCell-To-Add-Modify parameter. If the dedicated radio resource configuration parameters of an sCell comprise a cell group index for a first secondary cell, the secondary cell may be assigned to a secondary cell group identified by the cell group index. Otherwise, the first secondary cell may be assigned to a primary cell group. According to an example embodiment, the dedicated radio resource configuration parameters of an sCell may not modify the cell group index of an already configured cell. The cell group index may be configured only when the sCell is added (configured). If an eNB needs to change the cell group index of an already configured sCell, the eNB may need to release (remove) the sCell and configure (add) the sCell with a new updated cell group index (pTAG index or sTAG index). The added sCell may have the same physical cell identifier and downlink frequency. The added sCell may be assigned the same sCell index. In an example embodiment, the added sCell may be assigned a different sCell index. This process may be applicable, when there is no handover. A different process may be applicable when the RRC message includes a handover configuration.

Figure 11:
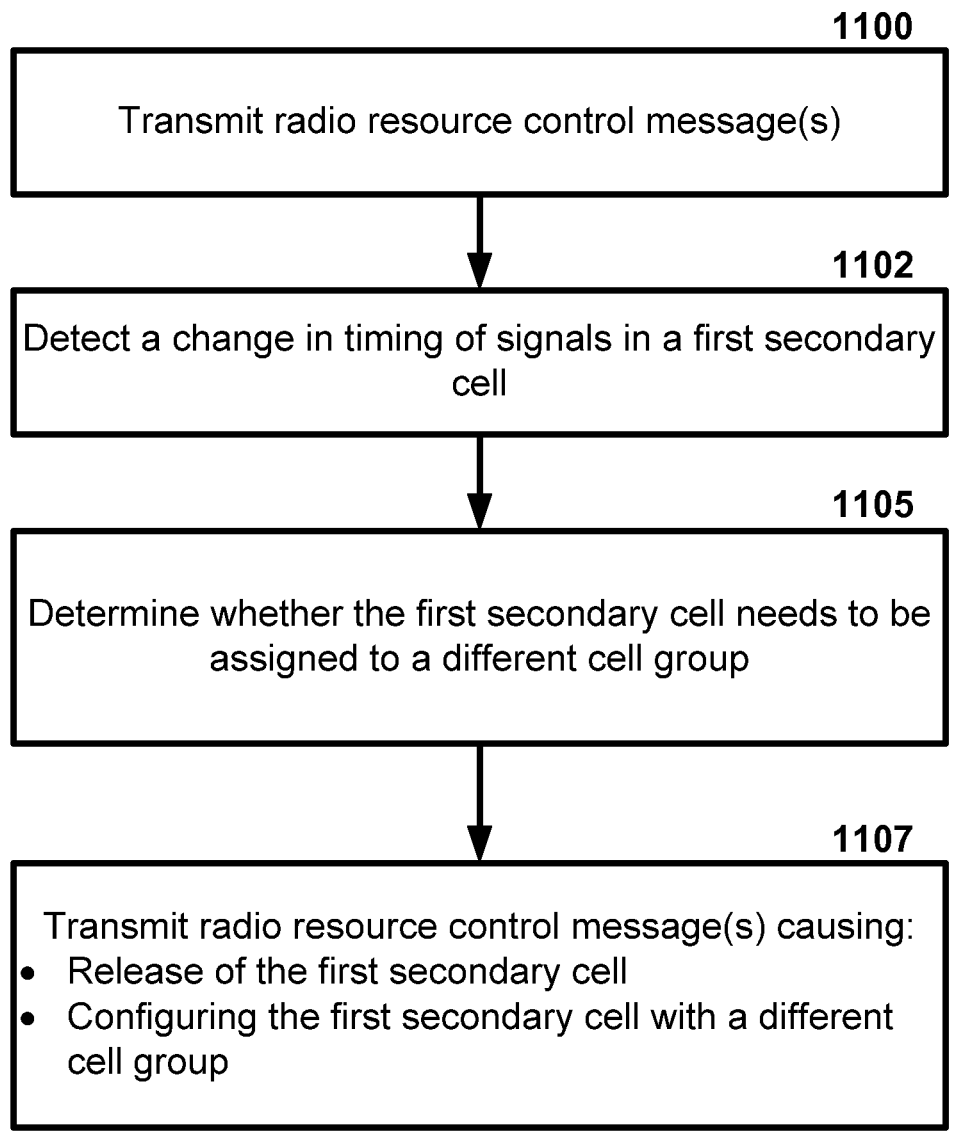
FIG. 11 is an example flow diagram illustrating a change in timing advance group configuration as per an aspect of an embodiment of the present invention.

FIG. 11 is an example flow diagram illustrating a change in timing advance group configuration as per an aspect of an embodiment. According to some of the various aspects of embodiments, a base station may be configured to communicate employing a plurality of cells. The base station may transmit at least one first radio resource control message to a wireless device at block 1100. The at least one first radio resource control message may be configured to cause in the wireless device configuration of a primary cell and at least one secondary cell in the plurality of cells. The at least one first radio resource control message may be configured to cause assignment of each of the at least one secondary cell to one cell group in at least one cell group. A cell group in the at least one cell group may comprise a subset of the plurality of cells. Uplink transmissions of the wireless device in the cell group may employ a reference timing cell. Uplink transmissions of the wireless device in the cell group may employ a synchronization signal on an activated cell in the cell group as a timing reference.

The base station may detect a change in timing of signals received from the wireless device in a first secondary cell in a first cell group at block 1102. The timing of signals received from the wireless device may change due to wireless device mobility or due to changes in the propagation environment.

For example, the wireless device may move in the coverage area of a repeater or may move out of the coverage area of a repeater. The base station may transmit one or more timing advance command to align uplink timing of the wireless device.

The at least one cell group may comprise a primary cell group and a secondary cell group. The primary cell group may comprise a first subset of the plurality of cells. The first subset may comprise the primary cell. Uplink transmissions by the wireless device in the primary cell group may employ a first synchronization signal transmitted on the primary cell as a primary timing reference. The secondary cell group may comprise a second subset of the at least one secondary cell. Uplink transmissions in the secondary cell group may employ a second synchronization signal on an activated secondary cell in the secondary cell group as a secondary timing reference.

The at least one first radio resource control message may comprise a plurality of media access control dedicated parameters. The plurality of media access control dedicated parameters may comprise a deactivation timer value.

The at least one third radio resource control message may comprise a plurality of dedicated parameters for the first secondary cell. The plurality of dedicated parameters may be specific to the wireless device. If the plurality of dedicated parameters comprise a cell group index for the first secondary cell, the first secondary cell may be assigned to a secondary cell group identified by the cell group index. Otherwise, the first secondary cell is assigned to a primary cell group. Basically, RRC messages causing configuration of secondary cell(s) assigned to a primary cell group may not include a cell index and those secondary cells without a cell index may be implicitly assigned to the primary timing advance group. The RRC message configuration parameters that causes configuration of secondary cell(s) assigned to the primary cell group may not explicitly comprise a cell group index.

According to some of the various aspects of embodiments, the change in the timing of signals received in the first secondary cell may be detected by a comparison of the received signal timings with a reference frame timing in the base station. The change in the timing of signals received in the first secondary cell may be detected by a comparison of the received signal timing with timing of another cell in the first cell group. The change in the timing of signals received in the first secondary cell may be detected by a comparison with timing of signals received in the primary cell. The base station may detect that the uplink signal timing change employing other similar or different implementation specific mechanisms.

The base station may selectively, and depending on the characteristics of the change in timing, transmit one or more timing advance commands to align uplink timing of the cells. In some scenarios, the timing may not be align-able employing one or more timing advance commands. For example, the wireless device may transmit on a primary cell in a first band and on a secondary cell on a second band. The wireless device may move in the coverage area of a single band repeater for the second band. The single band (second band) repeater may cause additional delay in uplink signals of a secondary cell received by a base station (but may not affect the signals of a primary cell). The delay caused by the repeater may not be align-able by the base station if the primary cell and the secondary cells are in the same timing advance group. Other scenarios may also be possible depending on the mobility of the wireless device and network settings and configuration.

The base station may determine that the change in timing may be aligned employing one or more timing advance commands. In another scenario, the base station may determine that the first secondary cell needs to be assigned to a different cell group than the first cell group as shown at block 1105. In an example embodiment, the base station may determine that the first secondary cell needs to be assigned to a different cell group if the timing of signals is aligned with a timing of signals received in the primary cell. In another example embodiment, the base station may determine that the first secondary cell needs to be assigned to the different cell group if the timing of signals with the change cannot be aligned employing at least one timing advance command. Other example scenarios on how the base station determines that the cell group needs to changed or does not need to be changed may be provided as implementation options.

The first secondary cell may have a downlink carrier frequency and a physical cell identifier. The downlink carrier frequency and physical identifier of the first secondary cell does not change due to timing advance group re-configuration. The downlink carrier frequency and physical identifier are physical characteristics of the cell and may not change when the cell is configured. Other example physical parameters that may not be reconfigured may include bandwidth, common reference signals, and/or the like.

In an example implementation the first cell group may be a primary cell group. The second cell group may be a secondary cell group. In another example embodiment, the first cell group may be a secondary cell group, and the second cell group may be a primary cell group. The at least one first radio resource control message may be configured to cause assignment of a first cell index to the first secondary cell.

If the base station determines that the cell group configuration needs to be changed, the base station may start a timing advance group configuration change process by transmitting one or more RRC messages to the wireless device. Such a signaling process is not applicable to release 10 or earlier releases of LTE technology. Signaling mechanisms may be developed to address this TAG configuration change, when a base station detects/decides that TAG configuration should be changed. Different embodiments may be implemented to change timing advance group configurations. In this disclosure, different embodiments are presented to change a current timing advance configuration of a wireless device.

According to some of the various aspects of embodiments, the base station may transmit at least one second radio resource control (RRC) message configured to cause in the wireless device release of the first secondary cell at block 1107. The cell that requires a cell group change may be released employing an SCellToReleaseList-r10 information element employing the SCell index. If TAG configuration of more than one SCell needs to be changed, SCellToReleaseList-r10 may include a list of more than one SCell index.

The base station may transmit at least one third radio resource control message configured to cause in the wireless device configuration of the first secondary cell at block 1107. The configuration may assign the first secondary cell to a second cell group different from the first cell group. The SCell may be deactivated in the wireless device when it is configured. The at least one third radio resource control message may be configured to cause assignment of the same the first cell index to the first secondary cell. Physical parameters such as physical cell ID and downlink frequency of the first secondary cell may not change when it is released and configured again. The base station may transmit an activation command to activate the first secondary cell in the wireless device.

In another embodiment, the cell index of the first secondary cell may be changed after it is released and then configured employing at least one third radio resource control message.

There are a limited number of cell index available for the base station and base station may assign SCell indexes to secondary cells when a secondary cell is configured.

According to some of the various aspects of embodiments, the base station may transmit at least one second control message configured to cause in the wireless device: release of the first secondary cell having a first cell index and configuration of the first secondary cell with a second cell index different from the first cell index at block 1107. The same radio resource message may release the first secondary cell and then configure the first secondary cell. The cell that requires a cell group change may be released employing an SCellToReleaseList-r10 information element employing the first SCell index. If TAG configuration of more than one SCell needs to be changed, SCellToReleaseList-r10 may include a list of more than one SCell index. The same radio resource control message may configure the first secondary cell in a different cell group. The first secondary cell may be configured employing the SCellToAddMod-r10 in the at least one second control message. The same first secondary cell that is released in a radio resource control message may be added (configured) employing the same radio resource control message.

SCellToAddMod-r10 may cause configuration of the first secondary cell. The configuration of the first secondary cell may cause assignment of the first secondary cell to a second cell group different from the first cell group. The same RRC message releases and adds the first secondary cell. The first secondary cell may assign a different SCell index before it is released and after it is added. The RRC message may use SCellToReleaseList-r10 for the first index of the first secondary cell. And then the RRC message may use SCellToAddMod-r10 and add the same first secondary cell with a different SCell index than the first index. They physical Cell ID and downlink frequency of the first secondary cell remains the same. The first secondary cell may be deactivated after it is added (configured). The base station may transmit an activation command to activate the first secondary cell in the wireless device.

According to some of the various aspects of embodiments, the base station may transmit at least one second control message configured to cause in the wireless device: release of the first secondary cell having a first cell index and configuration of the first secondary cell with a same first cell index at block 1107. The same radio resource message may release the first secondary cell and then configure the first secondary cell with the same cell index. The cell that requires a cell group change may be released employing an SCellToReleaseList-r10 information element employing the first SCell index. If TAG configuration of more than one SCell needs to be changed, SCellToReleaseList-r10 may include a list of more than one SCell index. The same radio resource control message may configure the first secondary cell in a different cell group. The first secondary cell may be configured employing the SCellToAddMod-r10 in the at least one second control message. The same first secondary cell that is released in a radio resource control message may be added (configured) employing the same radio resource control message.

SCellToAddMod-r10 may cause configuration of the first secondary cell. The configuration of the first secondary cell may cause assignment of the first secondary cell to a second cell group different from the first cell group.

The same RRC message releases and adds the first secondary cell. The first secondary cell may be assigned the same SCell index before it is released and after it is added. The RRC message may use SCellToReleaseList-r10 for the first index of the first secondary cell. And then the RRC message may use SCellToAddMod-r10 and add the same first secondary cell with the same SCell index as the first index. In order to maintain the same SCell index, the information elements in an RRC message content may be ordered in a way that SCellToReleaseList-r10 is processed before SCellToAddMod-r10. The wireless device may process SCellToReleaseList-r10 with the first SCell index, and then add (configure) the first secondary cell by processing SCellToAddMod-r10 that adds the first secondary cell with the same SCell index. This process for SCell configuration enhances the overall efficiency and reduces overhead, because not only it requires one RRC message for release and addition of the same first secondary cell, it also employs the same SCell index for the first secondary cell before SCell release and after SCell addition. The proper order of information elements in RRC message in this embodiment enables release and addition of the same SCell without changing the SCell index. The order may be defined according to a pre-defined processing order rule in the base station and wireless device. The order may be based on sequential order, or may be according to any order rule on how to process information elements in an RRC message as they are arrange in the RRC message and as they are processed by the wireless device. SCellToReleaseList-r10 may be processed before SCellToAddMod-r10, otherwise the processing of the RRC message may result in an error scenario. If SCellToAddMod-r10 adds an SCell with the same cell index and then SCellToReleaseList-r10 release the SCell, at least one or both of the processes may result in error an scenario.

They physical Cell ID and downlink frequency of the first secondary cell may also remain the same. The first secondary cell may be deactivated after it is added (configured). The base station may transmit an activation command to activate the first secondary cell in the wireless device. A cell index may remain the same before the at least one second control message is transmitted and after the at least one second control message is processed.

According to some of the various aspects of embodiments, multiple random access procedures may not be processed in parallel in the UE. In other words, only one RA process may run at a time. An eNB may not start parallel RA processes and the UE may not have the capability of parallel transmission of preambles on multiple cells. A UE may start a random access process on a second cell when a random access process on a first cell has terminated. The termination may be due to, for example: a successful RA process, a failure in an RA process, or an aborted ongoing random access process. In some situations, error cases may occur, for example, an eNB may detect that the random access process has been terminated, while a UE may still be in an on-going RA process. This may be for various reasons including signal loss or misdetection in a radio interface, other reasons such as processing errors in the UE or eNB, and/or the like. For many unpredicted causes, an eNB may improperly assume that a random access process is terminated while a UE is still continuing a random access process. Examples of unpredictable reasons may include: the UE still waiting for a RAR or the UE planning to send a preamble in the uplink. When the UE is in a poor coverage area, the probability of such an error scenario may increase.

An eNB may transmit a PDCCH order to a UE for preamble transmission on a Cell while a UE is still in a random access process in the same or a different cell. In an example embodiment, such a condition may be considered an error scenario. If the UE receives a PDCCH order while there is an ongoing RA process in the UE, the UE may abort the ongoing RA procedure. The UE may stop the existing RA process and clear its parameters. The UE may process the received PDCCH order. The UE may transmit a random access preamble based on the new PDCCH order and may restart associated timers and may configure random access parameters according to the new PDCCH order. In this example implementation, the UE may have the same state with the eNB on the SCell where the RA procedure is running. By following a BS order, the UE may reset the error scenario and UE state and parameters may become compatible with the random access state and parameters in the eNB. For example, the preamble usage and RA resource usage parameters may be the same in the UE and eNB after the new PDCCH order is processed.

An RA process may be considered running, for example, if the corresponding timers are still running. Examples of corresponding times include a RAR window timer, and/or the like. A RA process may be considered running if the maximum number of allowed preamble transmissions has not been achieved yet. A random access response may be considered terminated, for example, when a valid RAR is received from an eNB or when a UE transmits a packet in response to RAR.

In another example embodiment, an eNB may intend for a PDCCH order to be received while an RA is running. An eNB may purposefully transmit a PDCCH order while a UE is in an ongoing random access process. This may be used as a tool to terminate an existing random access process and start a new one. An eNB may transmit a PDCCH order when there is an ongoing RA process in the UE. This may be for example: because an eNB has decided that the SCell is not the proper SCell for the timing reference, or because the eNB detected a new SCell in the sTAG which may be a better candidate to be the reference timing SCell. In the example embodiments, the UE may not ignore a received PDCCH order when it is in an ongoing RA procedure. When a UE receives a PDDCH order for preamble transmission, the UE may abort the ongoing RA procedure and then start a new RA procedure based on the newly received PDCCH order.

In another example embodiment, RA processes may be assigned different priorities. For example, an RA process on a pCell may be assigned a higher priority than an RA process on an sCell. When a PDCCH order is received for a preamble transmission when an RA process with the same or lower priority is running, the running random access process may be aborted and a new RA process according to the PDCCH order may be started. But, if a PDCCH order has been received for starting an RA on an SCell while the UE is running an RA process on a pCell, then the UE may ignore the PDCCH order and continue its ongoing RA on the pCell. An RA on a pCell may be more important than an RA on an sCell. A successful RA process on a pCell may prevent a radio link failure in some example scenarios, for example, when a UE has determined that it has lost (or is close to losing) the pTAG timing and the UE (or eNB) has started a RA to gain uplink pTAG timing.

In another example embodiment, a similar process may be applied in the eNB when the eNB receives a preamble on a pCell while the eNB is in an ongoing RA process with an sTAG. In this scenario, the eNB may abort the ongoing RA process on the sTAG and may start the RA process on the pTAG. The eNB may assume that the UE has aborted the RA process in the sTAG and that the UE has started an RA process on the pTAG.

Figure 12:
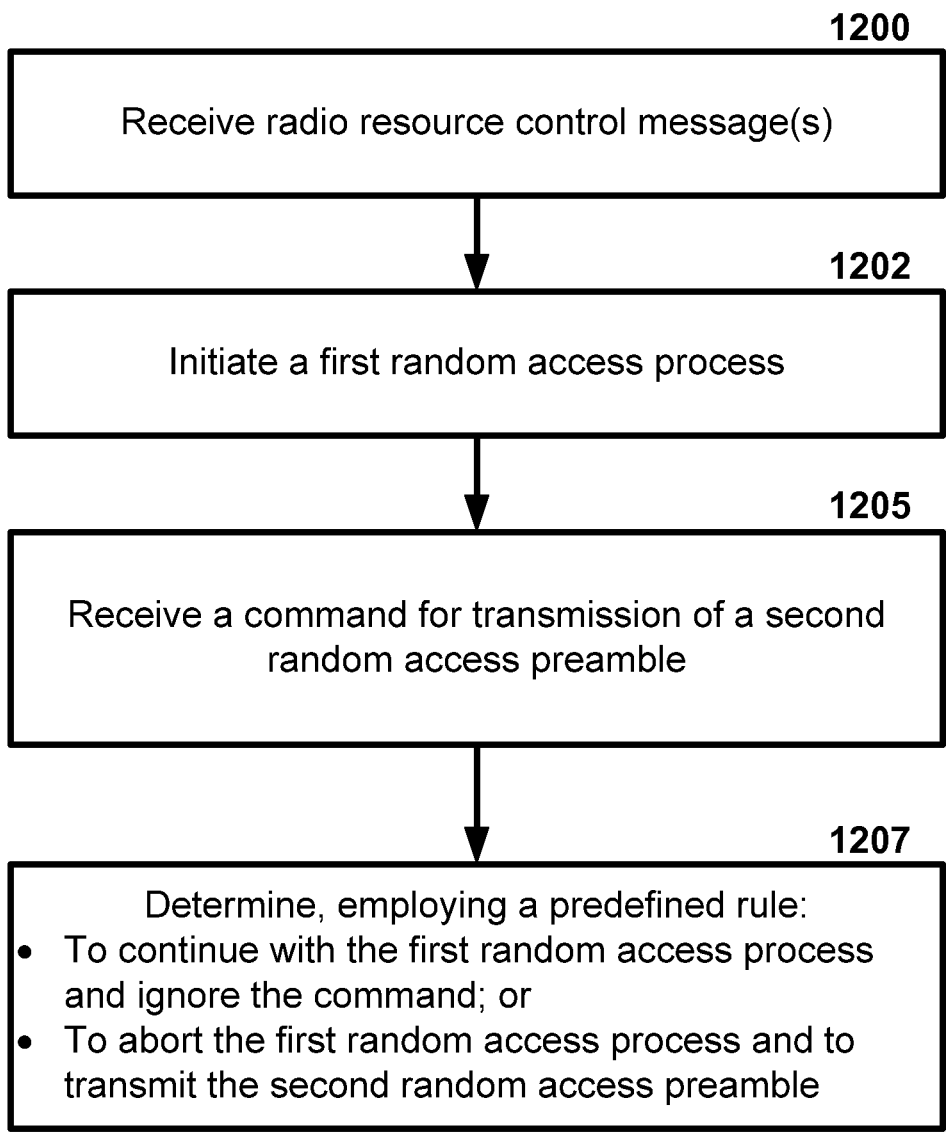
FIG. 12 is an example flow diagram illustrating random access process(s) as per an aspect of an embodiment of the present invention.

FIG. 12 is an example flow diagram illustrating random access process(s) as per an aspect of an embodiment of the present invention. According to some of the various aspects of embodiments, a wireless device may be configured to communicate employing a plurality of cells. The wireless device may receive at least one control message from a base station at block 1200. The at least one control message may cause in the wireless device configuration of a primary cell and at least one secondary cell in the plurality of cells. The at least one control message may cause in the wireless device assignment of each of the at least one secondary cell to a cell group in a plurality of cell groups. The plurality of cell groups may comprise a primary cell group and a secondary cell group. The primary cell group may comprise a first subset of the plurality of cells. The first subset may comprise the primary cell. The secondary cell group may comprise a second subset of the at least one secondary cell. Uplink transmissions by the wireless device in the primary cell group may employ a first synchronization signal transmitted on the primary cell as a primary timing reference. Uplink transmissions in the secondary cell group may employ a second synchronization signal on an activated secondary cell of the secondary cell group as a secondary timing reference.

The wireless device may initiate a first random access process on a first uplink carrier of a first cell in the plurality of cells in response to receiving a first control command at block 1202. The wireless device may receive a second control command for transmission of a second random access preamble on a second uplink carrier of a second cell in the plurality of cells while the first random access process is on-going at block 1205. In an example embodiment, the second cell may be different from the first cell. The wireless device may determine employing a pre-defined rule: to continue with the first random access process and ignore the second control command, or to abort the first random access process and to transmit the second random access preamble at block 1207.

According to some of the various aspects of embodiments, pre-defined rules may be defined in the wireless device. In one example implementation, the pre-defined rule may determine to continue with the first random access process if: the first cell is the primary cell, and the second cell is a secondary cell in the secondary cell group. In another example embodiment, the pre-defined rule may determine to continue with the first random access process if: the first cell is a secondary cell in the secondary cell group, and the second cell is the primary cell. In another example embodiment, the pre-defined rule may determine to continue with the first random access process and ignore the second control command.

According to some of the various aspects of embodiments, the at least one control message may be configured to further cause in the wireless device configuration of a time alignment timer for each of the plurality of cell groups. The time alignment timer may start or restart in response to the wireless device receiving a timing advance command to adjust uplink transmission timing of a commanded cell group in the plurality of cell groups. The first control command may comprise: a mask index and a preamble identifier of a random access preamble. The first control command may further comprise an index identifying the first cell only if the control command is not transmitted on the first cell. The first control command may further comprise an index identifying the first cell only if the control command is not transmitted on the first cell. The at least one control message may further cause in the wireless device configuration of random access resources for the first cell and the second cell. The at least one control message may comprise a plurality of common parameters for the first cell and the second cell. The plurality of common parameters may comprise a first plurality of random access resource parameters and a second plurality of random access resource parameters. The first plurality of random access resource parameters may identify first random access resources for the first cell. The second plurality of random access resource parameters may identify second random access resources for the second cell.

According to some of the various aspects of embodiments, a wireless device may receive at least one control message from a base station at block 1200. The at least one control message may cause in the wireless device configuration of a primary cell and at least one secondary cell in the plurality of cells. The at least one control message may cause in the wireless device assignment of each of the at least one secondary cell to a cell group in a plurality of cell groups. The plurality of cell groups may comprise a primary cell group and a secondary cell group. The wireless device may initiate a first random access process on a first uplink carrier of a first cell in the plurality of cells in response to receiving a first control command at block 1202. The wireless device may receive a second control command for transmission of a second random access preamble on a second uplink carrier of a second cell in the plurality of cells while the first random access process is on-going at block 1205. The wireless device may determine employing a pre-defined rule: to continue with the first random access process and ignore the second control command, or to abort the first random access process and to transmit the second random access preamble at block 1207.

According to some of the various aspects of embodiments, pre-defined rules may be defined in the wireless device. In one example implementation, the pre-defined rule may determine to abort the first random access process if: the first cell is the primary cell, and the second cell is a secondary cell in the secondary cell group. In another example implementation, the pre-defined rule determines to abort the first random access process if: the first cell is a secondary cell in the secondary cell group; and the second cell is the primary cell. In an example embodiment, the pre-defined rule may determine to abort the first random access process and to transmit the second random access preamble. In an example embodiment, the pre-defined rule determines to continue with the first random access process if the first random access preamble is transmitted before reception of the second control command; and to abort the first random access process if the second control command is received before transmission of the first random access preamble.

According to some of the various aspects of embodiments, the second cell may be the same as the first cell. The wireless device may receive a second control command for transmission of a second random access preamble on an uplink carrier of a cell in the plurality of cells (at block 1205) while the first random access process is on-going on the same cell.

The wireless device determines to continue with the first random access process if: the first cell is the primary cell; and the second cell is the primary cell. For example, the wireless device may determine to abort the first random access process if: the first cell is the primary cell; and the second cell is the primary cell. In another example, the wireless device may determine to continue with the first random access process if: the first cell is a secondary cell in the secondary cell group; and the second cell is also the secondary cell. In another example, the wireless device determines to abort the first random access process if: the first cell is a secondary cell in the secondary cell group; and the second cell is also the secondary cell.

Embodiments may determine UE behavior when a downlink timing reference SCell and/or pathloss reference SCell of an sCell or sTAG are not properly detected/decoded by a UE. For the case of a pCell, such a scenario may result in a radio link failure. Such a scenario for an sCell or sTAG may not result in a UE initiating a radio link failure procedure. A UE may lose its timing because it is no longer obtaining its timing from a timing reference SCell. A UE may lose its timing because its pathloss reference is no longer obtaining a pathloss reference downlink carrier. This may be for various reasons, such as: a poor signal level, poor coverage quality due to high interference levels, deactivation of a reference SCell, a downlink timing jump on a reference SCell or another SCell, a combination of these reasons, and/or the like. In another example, a UE may move to the coverage area of a repeater, and some of the carriers (passing through the repeater) may experience a sudden delay in the downlink signal. A UE may not be able to use an SCell as the path loss reference when the signal quality of the SCell is poor. When a UE does not have a proper timing reference for an uplink transmission, its uplink transmission may cause unwanted interference. When a UE cannot detect the proper pathloss, the UE may not be able to properly calculate its transmission power, and the UE may transmit signals with extra power creating unwanted interference in the network.

According to some of the various aspects of embodiments, a UE may suspend uplink transmissions in affected SCells when the UE detects that it does not have a proper uplink timing reference or when it is not able to properly calculate the pathloss. An eNB may not be initially aware of such a situation, and may schedule a UE for uplink transmission on that sTAG or SCell. But, the UE may not execute eNB PDCCH commands and may suspend uplink transmissions. In an example embodiment, a UE may transmit a Channel Quality Indicator (CQI) of zero for cells that do not have a valid timing reference or a valid pathloss reference. If a timing reference of a reference secondary cell is lost by a UE, the UE may autonomously select another activated SCell in the secondary cell group as the timing reference (if there is another activated SCell in the secondary cell).

In an example embodiment, an sTAG may have one timing reference SCell at a given time for uplink PUSCH and SRS transmission. All SCells in an sTAG may use the same SCell timing reference. When a timing reference cannot be properly detected and there are no other active SCell in the secondary cell group, the uplink transmission in uplink SCells in the sTAG may be suspended. In another example embodiment, a UE may suspend uplink transmissions after a time alignment timer associated with the sTAG expires. In an sTAG, a pathloss reference may be configured explicitly or implicitly on a per sCell basis. For example, the SIB2 (system information block 2) downlink carrier associated with an uplink carrier may be used as the pathloss reference. Therefore, an SCell may have its own pathloss reference. When a UE cannot properly detect a pathloss reference of an SCell, the UE may suspend uplink transmission on that SCell. The UE may continue uplink transmission on other SCells belonging to the same sTAG if a pathloss reference for other SCells is properly detected. This process may reduce unwanted interference in the network. A pathloss reference may be configured on a per cell basis. A timing reference may be configured on a per sTAG basis. In an example embodiment, a UE may transmit CQI zero for active cells without a valid timing reference or pathloss reference.

In an example scenario, an eNB may detect an insufficient signal quality by: receiving CSI feedback, an SRS signal from a UE, by observing a higher than desired bit error rate in the uplink signals of an SCell of the UE, and/or the like. An eNB may then take actions such as: de-configuring or deactivating the SCell, not scheduling any uplink transmission on that SCell for the UE, and/or the like. But if eNB does not take such an action, and if the UE does not detect its timing reference or pathloss reference, the UE may stop uplink transmissions autonomously.

A eNB may detect that an unexpected UL timing loss and/or pathloss reference loss has occurred, for example, when the eNB assigns UL grants to the UE but does not receive uplink packets from the UE. In an example, an eNB may receive a CQI of zero for a given SCell. This may lead to unwanted wasted uplink resources until the eNB detects that the UE has lost its uplink timing. In an example embodiment, a UE may inform the eNB that it has lost timing or a pathloss reference for a given SCell or sTAG. A UE may indicate to the eNB of the occurrence of the uplink timing loss and/or pathloss reference loss, for example, by sending an RRC or MAC level indication to the eNB. The eNB may take an action such as not scheduling uplink packets in the sTAG or SCell, stopping SRS in that sTAG or SCell, starting an RA process on that sTAG, and/or the like. In another example embodiment, a UE may not inform the network about the autonomously stopping uplink transmission. An eNB may detect that the UE stopped uplink transmission, for example, by not receiving any signal in the uplink of a given SCell. The UE may not explicitly inform the eNB by sending a message to a UE informing the eNB about the autonomous suspension. When a UE loses its timing reference in an sTAG, the UE may not initiate a random access process. The eNB may detect that regular UL activities of the UE (e.g. SRS) are stopped and may send a PDCCH order to establish a timing reference and uplink timing of the sTAG.

In an example embodiment, when a UE is unable to detect the downlink reference timing for an sTAG or when there is a sudden timing jump in the downlink timing of an SCell, the UE may inform the eNB that a change in timing has occurred or may inform the eNB that the timing is invalid or the UE has lost timing of an SCell or an sTAG. In another example, a UE may inform the eNB that the timing of an sTAG is invalid. In another example, when the pathloss reference for an SCell is invalid, the UE may inform the eNB that the pathloss reference is invalid.

According to some of the various aspects of embodiments, a wireless device may be configured to communicate employing a plurality of cells. The wireless device may receive at least one control message from a base station. The at least one control message may cause in the wireless device configuration of a primary cell and at least one secondary cell in the plurality of cells. The at least one control message may cause in the wireless device assignment of each of the at least one secondary cell to a cell group (implicitly or explicitly) in a plurality of cell groups. The plurality of cell groups may comprise a primary cell group and a secondary cell group. The primary cell group may comprise a first subset of the plurality of cells. The first subset may comprise the primary cell. The secondary cell group may comprise a second subset of the at least one secondary cell. Uplink transmissions by the wireless device in the primary cell group may employ a first synchronization signal transmitted on the primary cell as a primary timing reference. Uplink transmissions in the secondary cell group may employ a second synchronization signal on an activated secondary cell of the secondary cell group as a secondary timing reference.

The at least one control message may comprise a pathloss reference for each secondary cell in the at least one secondary cell. The pathloss reference may be only configurable as a downlink of the secondary cell if the secondary cell is in the secondary cell group. The pathloss reference may be configurable as a downlink of the secondary cell or as a downlink of the primary cell if the secondary cell is in the primary cell group. The wireless device may transmit uplink signals to the base station in a first secondary cell in the secondary cell group. Transmission power of the uplink signals may be determined, at least in part, employing a received power of the pathloss reference assigned to the first secondary cell. Timing of the uplink signals in the secondary cell group may employ a second synchronization signal on an activated secondary cell in the secondary cell group as a secondary timing reference. In an example implementation, the activated secondary cell may be a first secondary cell. The activated secondary cell is different from the first secondary cell.

According to some of the various aspects of embodiments, the wireless device may stop, by the wireless device, transmission of uplink transport blocks in the secondary cell group if the following conditions are satisfied: the wireless device is unable to acquire timing of the second synchronization signal; and the secondary cell group does not comprise any other active cells. This may be done regardless of if time alignment timer is running or not running. In an embodiment, the wireless device may stop transmission of uplink transport blocks in the secondary cell group if the following conditions are satisfied: the wireless device is unable to acquire timing of the second synchronization signal; the secondary cell group does not comprise any other active cells; and a time alignment timer corresponding to the secondary cell group being expired. The wireless device may allow uplink transmission of at least one random access preamble in the secondary cell group if the conditions are satisfied. The wireless device may continue transmission of channel state information for the first secondary cell on an uplink carrier not belonging to the secondary cell group if the conditions are satisfied. The wireless device may continue transmission of HARQ feedback for transport blocks received on a downlink of the first secondary cell if the conditions are satisfied.

According to some of the various aspects of embodiments, the wireless device may initiate a radio link failure if the wireless device is unable to acquire timing of the first synchronization signal regardless of whether the wireless device acquires timing of the second synchronization signal. The wireless device may keep the connection with the base station active if the wireless device is able to acquire timing of the first synchronization signal regardless of whether the wireless device acquires timing of the second synchronization signal.

The wireless device may stop transmission of uplink transport blocks on the first secondary cell if the wireless device is unable to measure a received power of the pathloss reference for a period of time. The transmission power of the uplink signals may be determined, at least in part, employing measurements of a received power of the pathloss reference assigned to the first secondary cell. The transmission power of the uplink signals may be determined, at least in part, further employing at least one power control parameter received in the at least one control message. The transmission power of the uplink signals may be determined, at least in part, further employing at least one power control command transmitted by the base station.

The wireless device may receive at least one control packet comprising one or more power control commands. Transmission power of a plurality of packets transmitted by the wireless device may be calculated employing, at least in part: the received power of the pathloss reference assigned to the first secondary cell; and the one or more power control commands.

In an example embodiment, the wireless device may selecting, autonomously and without informing the base station, a new activated secondary cell in the secondary cell group as the secondary timing reference if the following conditions are satisfied: the wireless device is unable to acquire timing of the second synchronization signal; and at least one secondary cell, different from the active secondary cell, in the secondary cell group is active in the wireless device. The wireless device may continue transmission of uplink signals in the secondary cell group.

According to some of the various aspects of embodiments, when a TAT associated with the pTAG expires, all TATs may be considered as expired and the UE may: flush all HARQ buffers of all serving cells, clear any configured downlink assignment/uplink grants, and/or the RRC may release PUCCH/SRS for all configured serving cells. If the TAT associated with the PCell expires, the TAT of all sTAGs may be stopped and/or deconfigured.

UE behavior may be further defined when a TAT associated with the pTAG expires, or when TAT has already expired, and/or when the pTAG is out-of-sync. For example, a PHY/MAC process may need to be specified when the UE: receives a PDCCH order for starting an RA process on an sTAG, is running an ongoing RA process on an sTAG, or receives a PDCCH order on SCell PDCCH resources. A UE may avoid initiating and/or performing processes that requires battery power consumption in these situations. A PHY/MAC process may increase battery power consumption. This may be especially important when the UE is in a poor coverage environment.

If the PCell TAT expires during an on-going sTAG RA procedure. The UE may abort the on-going SCell RA procedure. The RA process may take a relatively long time, for example, when the UE is in poor coverage environment. For example, a UE may transmit the preamble multiple times while ramping up power in re-transmissions. Every time a preamble is transmitted, a UE may wait until a RAR window expires, and may retransmit a RA preamble until a maximum number of transmissions have been reached. In another example embodiment, an eNB may need to transmit RAR commands multiple times until a MAC RAR is successfully received. The UE may abort the random access procedure on an SCell if the TAT for the PCell expires (and/or the pTAG becomes out-of-sync) during the procedure. This may prevent or reduce the possibility of being in a state where an sTAG TAT is running while the pTAG TAT is not running. An RA process may take a relatively long time, for example, 5, 10, 20, or 50 msec when a subframe duration is approximately 1 msec. A UE may not start or re-start the TAT of an SCell when the TAT of the pTAG is not running. If the pTAG TAT expires during an on-going sTAG RA procedure, the UE may stop the RA process on the sTAG. In an example embodiment, a UE may autonomously start an RA process on the pCell when the pTAG TAT is expired to obtain uplink synchronization for the pTAG.

In another example embodiment, a UE may receive a PDCCH order to initiate an RA process on an sTAG while its pTAG TAT is not running and/or when the pTAG is out-of-sync. In this situation, the UE may ignore the received PDCCH order and may not start preamble transmission on the sTAG. In another example embodiment, a UE may receive a TA command for an sTAG, when its pTAG TAT is not running. The UE may not start or re-start the TAT of the SCell when the TAT of the pTAG is not running.

In another example embodiment, the UE may stop monitoring the PDCCH for all SCells when: the TAT associated with the pTAG expires, the TAT has already expired, and/or the pTAG is out-of-sync. This includes scenarios when cross-carrier scheduling is enabled or not enabled. This process may reduce battery power consumption when the TAT for a pTAG is not running. In another example embodiment, when the pTAG is out-of-sync, even if the UE monitors the PDCCH for activated SCells, a UE may not take any action when a PDCCH on an SCell or for an SCell (in case of cross carrier scheduling) is received. No downlink transmissions or uplink transmissions on SCells may be allowed when a TAT for the pTAG expires and/or the pTAG is out-of-sync. There may be no need to monitor PDCCH for an SCell when a TAT for the pTAG is not running.

Figure 13:
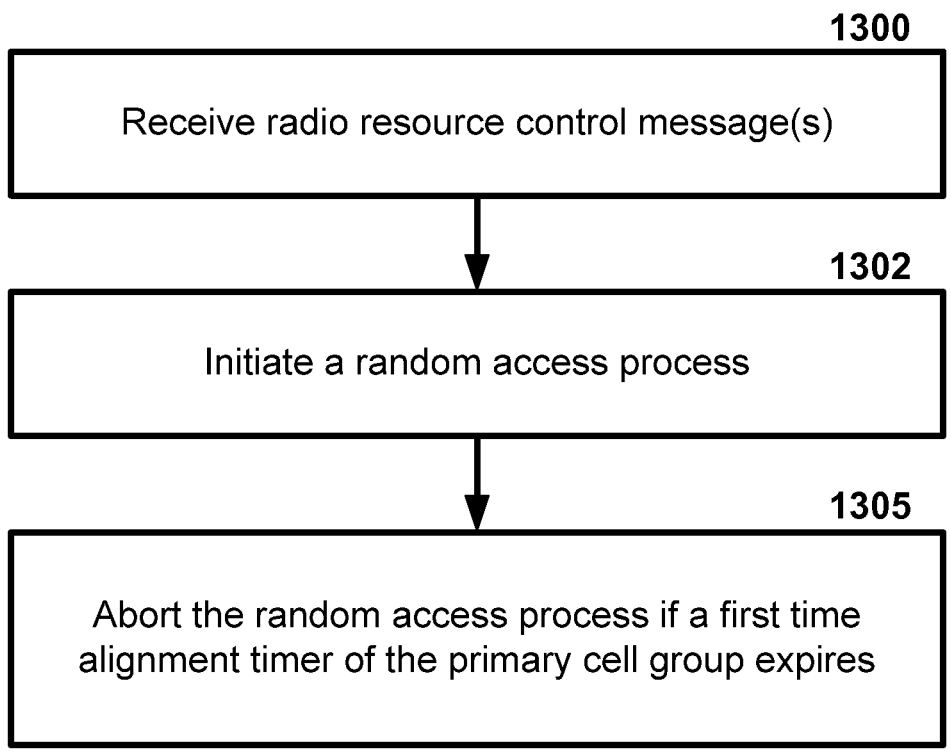
FIG. 13 is an example flow diagram illustrating random access process(s) as per an aspect of an embodiment of the present invention.

FIG. 13 is an example flow diagram illustrating random access process(es) as per an aspect of an embodiment of the present invention. According to some of the various aspects of embodiments, a wireless device may be configured to communicate employing a plurality of cells. The wireless device may receive at least one control message from a base station at block 1300. The at least one control message may cause in the wireless device configuration of a primary cell and at least one secondary cell in the plurality of cells. The at least one control message may cause in the wireless device assignment of each of the at least one secondary cell to a cell group (implicitly or explicitly) in a plurality of cell groups. The plurality of cell groups may comprise a primary cell group and a secondary cell group. The primary cell group may comprise a first subset of the plurality of cells. The first subset may comprise the primary cell. The secondary cell group may comprise a second subset of the at least one secondary cell. Uplink transmissions by the wireless device in the primary cell group may employ a first synchronization signal transmitted on the primary cell as a primary timing reference. Uplink transmissions in the secondary cell group may employ a second synchronization signal on an activated secondary cell of the secondary cell group as a secondary timing reference.

The at least one control message may cause in the wireless device configuration of a time alignment timer for each of the plurality of cell groups. The time alignment timer may start or restart in response to the wireless device receiving a timing advance command to adjust uplink transmission timing of a commanded cell group in the plurality of cell groups. The commanded cell group may be considered: out-of-sync in response to the time alignment timer being expired or not running; and in-sync in response to the time alignment timer running. The wireless device may configure the random access resources in response receiving the at least one control message. The at least one control message may comprise a plurality of random access resource parameters for the secondary cell. The plurality of random access resource parameters may comprise an index, a frequency offset, and a plurality of sequence parameters.

The wireless device may initiate a random access process for a secondary cell in the secondary cell group in response to receiving a control command at block 1302. The control command may comprise a mask index and a preamble identifier of a random access preamble. The control command may further comprise an index identifying the secondary cell if the control command is not transmitted on the secondary cell. The wireless device may transmit a first random access preamble on random access resources of the secondary cell in response to the control command. The wireless device may abort the random access process on the secondary cell if the primary cell group becomes out-of-sync at block 1305.

The wireless device may transmit, autonomously, a second random access preamble on the primary cell group to obtain uplink transmission timing of the primary cell group if the primary cell group becomes out-of-sync. The wireless device may receive a random access response on the primary cell from the base station. The wireless device may release the at least one secondary cell if the primary cell group becomes out-of-sync. The wireless device may ignore any message received in downlink control channels of each of the at least one secondary cell if the primary cell group becomes out-of-sync. The wireless device may stop monitoring downlink control channels of each of the at least one secondary cell if the primary cell group becomes out-of-sync. The wireless device may ignore any timing advance command for the secondary cell group if the primary cell group becomes out-of-sync.

According to some of the various aspects of embodiments, a wireless device may be configured to communicate employing a plurality of cells. The wireless device may receive at least one control message from a base station at block 1300. The at least one control message may cause in the wireless device configuration of a primary cell and at least one secondary cell in the plurality of cells. The at least one control message may cause in the wireless device assignment of each of the at least one secondary cell to a cell group (implicitly or explicitly) in a plurality of cell groups. The plurality of cell groups may comprise a primary cell group and a secondary cell group. The at least one control message may cause in the wireless device configuration of a time alignment timer for each of the plurality of cell groups. The time alignment timer may start or restart in response to the wireless device receiving a timing advance command to adjust uplink transmission timing of a commanded cell group in the plurality of cell groups. The wireless device may receive a control command initiating a random access process for a secondary cell in the secondary cell group. The wireless device may abort the random access process on the secondary cell if a first time alignment timer of the primary cell group expires.

The aborting, by the wireless device, of the random access process causes the wireless device: a) to stop transmission of a random access preamble for the random access process, if the random access preamble has not yet been transmitted; and/or b) to stop monitoring for random access responses corresponding to the random access preamble, if the random access preamble has been transmitted.

According to some of the various aspects of embodiments, a base station may be configured to communicate employing a plurality of cells. The base station may transmit at least one control message to a wireless device. The at least one control message may be configured to cause in the wireless device configuration of a primary cell and at least one secondary cell in the plurality of cells. The at least one control message may be configured to cause assignment of a cell group index to a secondary cell. The cell group index may identify a cell group in a plurality of cell groups. The plurality of cell groups may comprise a primary cell group and at least one secondary cell group. The primary cell group may comprise a first subset of the plurality of cells. The first subset may comprise the primary cell. A secondary cell group in the at least one secondary cell group may comprise a second subset of the at least one secondary cell. The at least one control message may be configured to cause configuration of a time alignment timer for each cell group in the plurality of cell groups. Uplink signals transmitted by the wireless device in the primary cell group may employ a first synchronization signal transmitted on the primary cell as a first timing reference. Uplink signals transmitted by the wireless device in the secondary cell group may employ a second synchronization signal transmitted on one of at least one activated cell in the secondary cell group as a second timing reference.

The at least one control message may comprise a plurality of radio dedicated parameters for each one of the at least one secondary cell. The one secondary cell is assigned to one of the at least one secondary cell group identified by a second cell group index if the plurality of radio dedicated parameters comprise the second cell group index for the one secondary cell. Otherwise, the one secondary cell assigned to the primary cell group. The at least one control message comprises at least one radio resource control message. The at least one control message is further configured to add or modify a radio bearer.

The at least one control message may comprise a plurality of media access control dedicated parameters. The plurality of media access control dedicated parameters may comprise: a time alignment timer value for the primary cell group and a sequence of at least one element. Each element may comprise one time alignment timer value and one cell group index. The one time alignment timer value may be associated with a cell group identified by the one cell group index. Each time alignment timer value may be selected, by the base station, from a finite set of predetermined values. The plurality of media access control dedicated parameters may be wireless device specific. The plurality of media access control dedicated parameters may comprise a deactivation parameter for the at least one secondary cell. The finite set of predetermined values may be eight. Each time alignment timer value may be encoded employing three bits.

The base station may transmit a timing advance command. The timing advance command may comprise a time adjustment value and a first cell group index. A first time alignment timer may correspond to a first cell group identified by the first cell group index starts or restarts in response to the base station successfully transmitting the timing advance command to the wireless device. The timing advance command may cause substantial alignment of reception timing of uplink signals in frames and subframes of all one or more activated uplink carriers in the first cell group at the base station. The uplink signals are transmitted by the wireless device.

The first cell group may be considered out-of-sync in response to the first time alignment timer being expired or not running. The first cell group may be considered in-sync in response to the first time alignment timer running. The base station may transmit a control command configured to cause transmission of a random access preamble on random access resources of a first secondary cell in the first cell group. The base station may transmit a random access response on the primary cell. The random access response may comprise a second timing advance command, an uplink grant, and an index identifying the random access preamble.

According to some of the various aspects of embodiments, PDCCH order may be used to trigger RACH for an activated SCell. For a newly configured SCell or a configured but deactivated SCell, eNB may need to firstly activate the corresponding SCell and then trigger RACH on it. In an example embodiment, with no retransmission of activation/deactivation command, activation of an SCell may need at least 8 ms, which may be an extra delay for UE to acquire the valid TA value on SCell compared to the procedure on an already activated SCell. For a newly configured SCell or a deactivated SCell, 8 ms may be required for SCell activation, and at least 6 ms may be required for preamble transmission, and at least 4 ms may be required to receive the random access response. At least 18 ms may be required for a UE to get a valid TA. The possible delay caused by retransmission or other configured parameters may need to be considered, e.g. the possible retransmission of activation/deactivation command, the time gap between when a RACH is triggered and when a preamble is transmitted (equal or larger than 6 ms). The RAR may be transmitted within the RAR window (for example, 2 ms, 10 ms, 50 ms), and possible retransmission of preamble may be considered. The delay for such a case may be more than 20 ms or even 30 ms if retransmissions are considered. The delay values provided in this paragraph are for an example scenario, and other values may apply to an implementation of random access process.

When time alignment timer of a secondary cell group expires, a PDCCH order may initiate a random access process for the secondary cell to synchronize the uplink timing of the active cells in the secondary cell group. This process may cause a relatively long delay until the secondary cell group is synchronized. An embodiment may be required to reduce the time required to synchronize uplink of an out-of-sync secondary cell group. In other word, a faster process may be needed to change the state of a secondary cell group from out-of-sync to in-sync.

Figure 14:
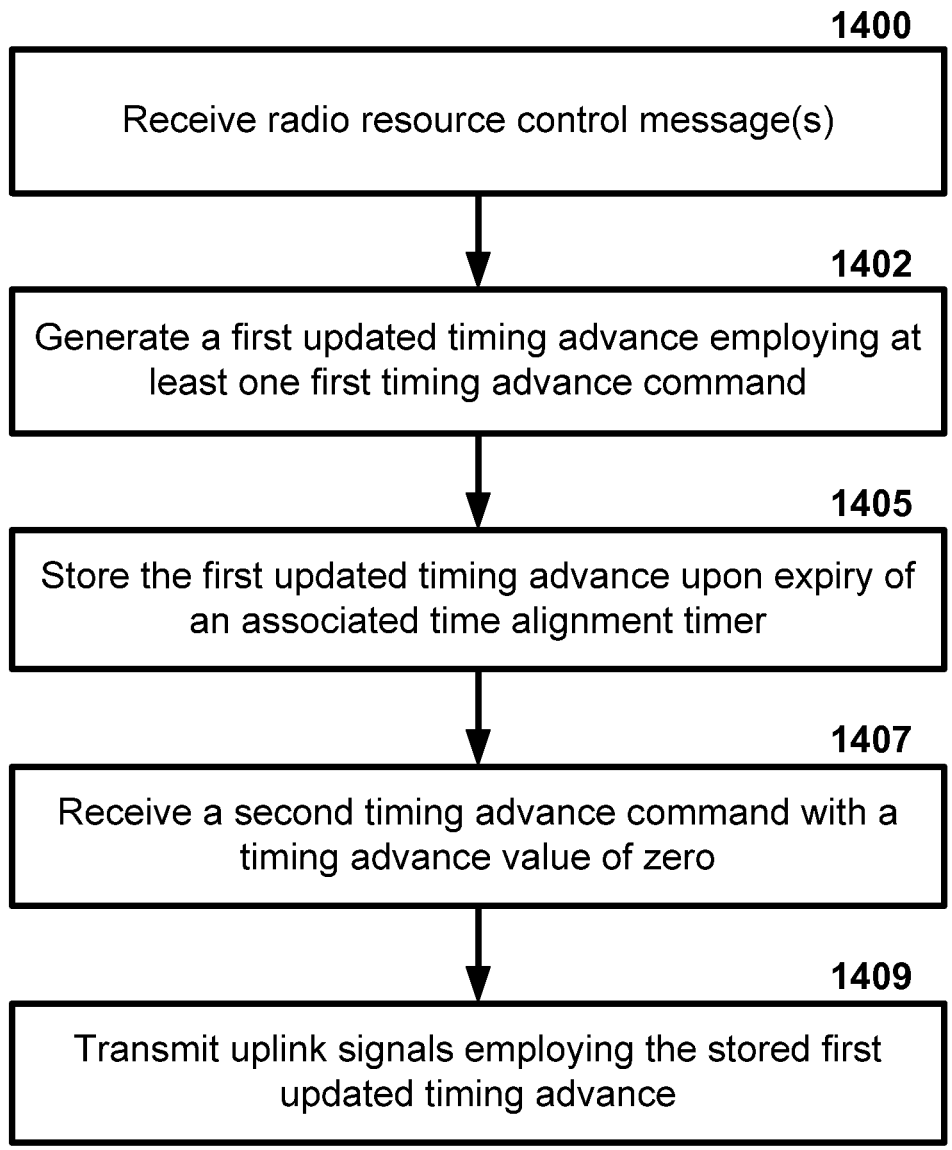
FIG. 14 is an example flow diagram illustrating uplink signal timing advance processing as per an aspect of an embodiment of the present invention.

FIG. 14 is an example flow diagram illustrating uplink signal timing advance processing as per an aspect of an embodiment of the present invention. According to some of the various aspects of embodiments, a wireless device may be configured to communicate employing a plurality of cells. The wireless device may receive at least one control message from a base station at block 1400. The at least one control message may cause in the wireless device configuration of a primary cell and at least one secondary cell in the plurality of cells. The at least one control message may cause in the wireless device assignment of each of the at least one secondary cell to a cell group (implicitly or explicitly) in a plurality of cell groups. The plurality of cell groups may comprise a primary cell group and a secondary cell group. The primary cell group may comprise a first subset of the plurality of cells. The first subset may comprise the primary cell. The secondary cell group may comprise a second subset of the at least one secondary cell. In an example implementation, uplink transmissions by the wireless device in the primary cell group may employ a first synchronization signal transmitted on the primary cell as a primary timing reference. Uplink transmissions in the secondary cell group may employ a second synchronization signal on an activated secondary cell of the secondary cell group as a secondary timing reference.

The at least one control message may comprise a plurality of media access control dedicated parameters. The plurality of media access control dedicated parameters may comprise a time alignment timer value for the primary cell group and a sequence of at least one element. Each element may comprise a time alignment timer value and a cell group index. The time alignment timer value may be associated with a cell group identified by a cell group index. Each time alignment timer value may be selected from a finite set of predetermined values. The at least one control message may cause in the wireless device configuration of a time alignment timer for each of the plurality of cell groups. The time alignment timer may start or restart in response to the wireless device receiving a timing advance command to adjust a timing advance of a commanded cell group in the plurality of cell groups. Timing advance refers to uplink transmission timing advance in a cell group.

When a secondary cell group is configured, it is initially in an out-of-sync state and its time alignment timer may not be running. Uplink transmission timing advance may be initialized as zero. A base station may start a random access process to synchronize uplink timing of the wireless device for the secondary cell group. The base station may transmit a PDCCH order, and receive a random access preamble. The base station may then transmit a random access response including a timing advance command for the secondary cell group. The time alignment timer of the secondary cell group starts running and the secondary cell group may become in-sync after the wireless device receives and processes the random access response. In an example embodiment, a method to initially synchronize the uplink transmission of a secondary cell group is initiating a random access process on the secondary cell group.

The secondary cell group may move to out-of-sync state, when the time alignment timer of the secondary cell group expires. To reduce the time required for changing the state of the secondary cell group from out-of-state to in-sync, the wireless device may store the updated timing advance of the secondary cell group when the secondary cell group becomes out-of-sync. The stored value of the timing advance may not be a proper value of the uplink transmission timing advance when the secondary cell group becomes in-sync again. Specially, when the wireless device moves around, the propagation delay may change, for example, wireless devices may move to the coverage area of a repeater, and/or the like. The value of the stored timing advance may be close the actual value of the timing advance for in-sync transmission of the wireless device, especially when the cell radius is small and/or the wireless device does not move, or moves slowly. In an example embodiment, the stored value of the timing advance may be employed in order to change the state of the secondary cell group from out-of-sync to in-sync relatively quickly and without initiating a random access process. This process may apply to the primary cell group, because when the primary cell becomes out-of-sync, the RRC layer in wireless device may initiate a radio link failure process.

According to some of the various aspects of embodiments, the wireless device may generate a first updated timing advance by updating a first timing advance of the secondary cell group employing at least one first timing advance command for the secondary cell group at block 1402. The first timing advance value is set to zero when the secondary cell group is configured. The first timing advance value may be initiated by a timing advance value in a random access response for a random access preamble transmitted in the secondary cell group. The first timing advance may be equal to a difference between received timing of the secondary timing reference and transmission timing of the uplink signals in the secondary cell group. The updating of the first timing advance may further employ changes in a received downlink timing if the received downlink timing changes are not compensated or are partly compensated by the at least one timing advance command. A timing advance command in the at least one first timing advance command may comprise a timing advance command value and an index of the secondary cell group. The wireless device maintains the value of the timing advance of the secondary cell group by applying the received timing advance commands and by autonomously changing the timing advance when required.

The wireless device may store the first updated timing advance upon expiry of an associated time alignment timer of the secondary cell group at block 1405. When the secondary cell group becomes out-of-sync, the wireless device may not change the timing advance value of the secondary cell group. The stored value of the first updated timing advance may remain the same until the secondary cell group in wireless device becomes in-sync again. The stored value may be employed in order to move the wireless device back to in-sync state again without initiating a random access process. In an example embodiment, the stored value of the first timing advance may be released in the wireless device when the secondary cell group is released.

The wireless device may receive a second timing advance command for the secondary cell group with a timing advance value of zero at block 1407. The second timing advance command may cause starting the associated time alignment timer. The wireless device may change the secondary cell group from an out-of-sync state to an in-sync state in response to the second timing advance command having a timing advance value of zero. In an example embodiment, the wireless device may transmit a sounding reference signal in a cell in the secondary cell group in response to receiving the second timing advance command if the at least one control message configures regular transmission of the sounding reference signal on the cell. The base station may not have an accurate estimate of the required uplink timing advance of the wireless device when the wireless device is out-of-sync. Specially, if the wireless device moves from one area to another area, its required timing advance may change. The base station therefore, may transmit a timing advance command for the secondary cell group with a timing advance value of zero. This may quickly change the state of the secondary cell group to in-sync, without initiating a random access process.

The wireless device may receive an uplink grant for an activated cell of the secondary cell group. The secondary cell group may be in in-sync state now and the wireless device may be able to transmit uplink signals. The wireless device may transmit uplink signals in radio resources identified in the uplink grant with a timing advance equal to the stored first updated timing advance at block 1409. The base station then may receive uplink signals from the wireless device. Then if the uplink signal timing in the secondary cell requires adjustment, the base station may transmit a timing advance command with a non-zero value to adjust uplink transmission timing in the secondary cell group and align its timing with a reference timing in the base station.

The wireless device may receive a third timing advance command for the secondary cell group subsequent to reception of the second timing advance command when the associated time alignment timer is running. The base station may be able to measure received signal timing in the secondary cell group and calculate the required time adjustment for the uplink signals in the secondary cell group. The third timing advance command may have a non-zero timing advance value. The third timing advance command may restart the associated time alignment timer.

In an example embodiment, the wireless device may receive a timing advance command for the secondary cell group subsequent to reception of said second timing advance command and when the associated time alignment timer is running. In an example embodiment, the base station may transmit timing advance command(s) for the secondary cell group with a timing advance value of zero when the time alignment is running. For example, when the uplink signal timing in the secondary cell group is synchronized and does not require adjustment, and the time alignment timer of the secondary cell group is close to expiry. The base station may transmit a timing advance command for the secondary cell group with a timing advance value of zero. This may cause the wireless device and base station restart the time alignment timer of the secondary cell group, and delay or prevent expiry of the associated time alignment timer. A timing advance command for a cell group may restart the associated time alignment timer of the cell group.

According to some of the various aspects of embodiments, an SCell without an uplink may be assigned to a TAG (sTAG or pTAG). An eNB may assign a TAG to the SCell without an uplink based on cell configuration parameters such as: cell downlink frequency, network deployment configurations, and/or the like. For example, an SCell without an uplink may be grouped with other SCells in the same band. A TAG may have at least one SCell with a configured uplink. Therefore, an SCell without an uplink may not be the only cell in a TAG. This may impose certain requirements in network configuration, for example, an SCell without an uplink may not be the only cell in a band. In another example, an SCell without an uplink may not be the only cell that is going through a single band repeater (therefore, may experience its own unique delay). It may be possible that an SCell without a configured uplink be selected as the timing reference for the sTAG comprising the SCell. In another example implementation, the requirement for a reference cell may be changed in a way that only active SCells with a configured uplink may be selected as a timing reference.

For an SCell without an uplink, the eNB may not have timing information about the propagation delay for that SCell. An SCell without an uplink may not have any uplink transmission, such as a PUSCH, a preamble, an SRS, and/or the like. An eNB may rely on one of the following to select a TAG for the SCell: the configuration parameters of the SCell, network deployment parameters, CSI feedback, a combination of these parameters, and/or the like. In an example embodiment, an sTAG may comprise at least one cell with a configured downlink and configured uplink. The SCell without an uplink may be the only active SCell in a TAG, and therefore may be the timing reference of the TAG.

According to some of the various aspects of embodiments, the UE transceiver may use the reference cell of the sTAG to receive the SCell downlink signal. Grouping an SCell without an uplink with a cell group, may allow the UE to employ the synchronization signal of the sTAG of the SCell for downlink subframe and frame reception. In an example embodiment, the TAG ID may not be a part of uplink parameters of an SCell configuration because SCells without an uplink do not comprise uplink parameters. SCells without an uplink may not include a RACH. Since the SCells without an uplink do not include other uplink channels such as an SRS or a PUSCH, the eNB may not be able to detect and monitor the timing delay for the SCell without an uplink. The eNB may receive uplink channel state information (CSI) and an ACK/NACK for an SCell without an uplink in the PCell PUCCH or UCI of other uplink packets transmitted on PUSCH of other carriers.

According to some of the various aspects of embodiments, a wireless device may be configured to communicate employing a plurality of cells. The wireless device may at least one control message from a base station. The at least one control message may cause in the wireless device configuration of a primary cell and a plurality of secondary cells in the plurality of cells. The plurality of cells consisting of: a plurality of downlink-uplink cells and at least one downlink-only cell. Each of the plurality of downlink-uplink cells may have a configured uplink and a configured downlink. Each of the at least one downlink-only cell may have a configured downlink with no configured uplink.

The at least one control message may cause in the wireless device assignment of each of the plurality of secondary cells to a cell group in a plurality of cell groups. The assignment may be done implicitly or explicitly as described in this disclosure. The plurality of cell groups may comprise a primary cell group and at least one secondary cell group. A primary cell group may comprise a first subset of the plurality of cells. The first subset may comprise the primary cell. A secondary cell group in the at least one secondary cell group may comprise a second subset of the plurality of secondary cells. Uplink signals transmitted by the wireless device in the primary cell group may employ a first synchronization signal transmitted on the primary cell as a first timing reference. Uplink signals transmitted by the wireless device in the secondary cell group may employ a second synchronization signal transmitted on one of at least one activated cell in the secondary cell group as a second timing reference. The primary cell may be a downlink-uplink cell.

The at least one control message may comprise a plurality of radio dedicated parameters for each one of the plurality of secondary cells. One secondary cell assigned to one of the at least one secondary cell group identified by a second cell group index if the plurality of radio dedicated parameters comprise the second cell group index for the one secondary cell. Otherwise, the one secondary cell is assigned to the primary cell group.

The at least one control message may further cause in the wireless device configuration of a time alignment timer for each cell group in the plurality of cell groups. The at least one control message may comprise at least one radio resource control message. The at least one control message may be further configured to add or modify a radio bearer. The at least one control message may comprise a time alignment timer parameter for each cell group in the plurality of cell groups.

The wireless device may receive at least one timing advance command from the base station. The timing advance command may comprise a time adjustment value, and an index identifying a first cell group in the plurality of cell groups. The wireless device may apply the timing advance command to uplink transmission timing of at least one downlink-uplink cell in the first cell group. The timing advance command may cause substantial alignment of reception timing of uplink signals transmitted by the wireless device in frames and subframes of one or more activated downlink-uplink cells in the first cell group at the base station.

Each cell group in the plurality of cell groups may comprise one or more of the plurality of downlink-uplink cells. At least one of the one or more downlink-uplink cells may be configured with a random access channel. Each of the at least one downlink-only cell may be assigned to a cell group comprising at least one of the plurality of downlink-uplink cells in the same frequency band as the downlink-only cell. A frequency band may comprise a plurality of frequency channels (carriers). The wireless device may start or restart a first time alignment timer corresponding to the first cell group in response to the wireless device receiving the timing advance command.

The first cell group may be considered out-of-sync in response to the first time alignment timer being expired or not running. The first cell group may be considered in-sync in response to the first time alignment timer running. The wireless device may receive a control command causing transmission of a random access preamble on random access resources of a first secondary cell in the secondary cell group.

According to some of the various aspects of embodiments, the random access procedure may be initiated by a PDCCH order or by the MAC sublayer itself. Random access procedure on an SCell may be initiated by a PDCCH order. If a UE receives a PDCCH transmission consistent with a PDCCH order masked with its C-RNTI (radio network temporary identifier), and for a specific serving cell, the UE may initiate a random access procedure on this serving cell. For random access on the PCell a PDCCH order or RRC optionally indicate the ra-PreambleIndex and the ra-PRACH-MaskIndex; and for random access on an SCell, the PDCCH order indicates the ra-PreambleIndex with a value different from zero and the ra-PRACH-MaskIndex. For the pTAG preamble transmission on PRACH and reception of a PDCCH order may only be supported for PCell.

According to some of the various aspects of embodiments, the procedure may use some of the following information: a) the available set of PRACH resources for the transmission of the random access preamble, prach-ConfigIndex, b) for PCell, the groups of random access preambles and/or the set of available random access preambles in each group, c) for PCell, the preambles that are contained in random access preambles group A and Random Access Preambles group B are calculated, d) the RA response window size ra-ResponseWindowSize, e) the power-ramping factor powerRampingStep, f) the maximum number of preamble transmission preambleTransMax, g) the initial preamble power preambleInitialReceivedTargetPower, h) the preamble format based offset DELTA_PREAMBLE, i) for PCell, the maximum number of Msg3 HARQ transmissions maxHARQ-Msg3Tx, j) for PCell, the Contention Resolution Timer mac-ContentionResolutionTimer. These parameters may be updated from upper layers before each Random Access procedure is initiated.

According to some of the various aspects of embodiments, the Random Access procedure may be performed as follows: Flush the Msg3 buffer; set the PREAMBLE_TRANSMISSION_COUNTER to 1; set the backoff parameter value in the UE to 0 ms; for the RN (relay node), suspend any RN subframe configuration; proceed to the selection of the Random Access Resource. There may be one Random Access procedure ongoing at any point in time. If the UE receives a request for a new Random Access procedure while another is already ongoing, it may be up to UE implementation whether to continue with the ongoing procedure or start with the new procedure.

According to some of the various aspects of embodiments, the Random Access Resource selection procedure may be performed as follows. If ra-PreambleIndex (Random Access Preamble) and ra-PRACH-MaskIndex (PRACH Mask Index) have been explicitly signalled and ra-PreambleIndex is not zero, then the Random Access Preamble and the PRACH Mask Index may be those explicitly signalled. Otherwise, the Random Access Preamble may be selected by the UE.

The UE may determine the next available subframe containing PRACH permitted by the restrictions given by the prach-ConfigIndex, the PRACH Mask Index and physical layer timing requirements (a UE may take into account the possible occurrence of measurement gaps when determining the next available PRACH subframe). If the transmission mode is TDD and the PRACH Mask Index is equal to zero, then if ra-PreambleIndex was explicitly signalled and it was not 0 (i.e., not selected by MAC), then randomly select, with equal probability, one PRACH from the PRACHs available in the determined subframe. Else, the UE may randomly select, with equal probability, one PRACH from the PRACHs available in the determined subframe and the next two consecutive subframes. If the transmission mode is not TDD or the PRACH Mask Index is not equal to zero, a UE may determine a PRACH within the determined subframe in accordance with the requirements of the PRACH Mask Index. Then the UE may proceed to the transmission of the Random Access Preamble.

PRACH mask index values may range for example from 0 to 16. PRACH mask index value may determine the allowed PRACH resource index that may be used for transmission. For example, PRACH mask index 0 may mean that all PRACH resource indeces are allowed; or PRACH mask index 1 may mean that PRACH resource index 0 may be used. PRACH mask index may have different meaning in TDD and FDD systems.

The random-access procedure may be performed by UE setting PREAMBLE_RECEIVED_TARGET_POWER to preambleInitialReceivedTargetPower+DELTA_PREAMBLE+(PREAMBLE_TRANSMISSION_COUNTER–

1)*powerRampingStep. The UE may instruct the physical layer to transmit a preamble using the selected PRACH, corresponding RA-RNTI, preamble index and PREAMBLE_RECEIVED_TARGET_POWER.

According to some of the various aspects of embodiments, once the random access preamble is transmitted and regardless of the possible occurrence of a measurement gap, the UE may monitor the PDCCH of the PCell for random access response(s) identified by the RA-RNTI (random access radio network identifier) a specific RA-RNTI defined below, in the random access response (RAR) window which may start at the subframe that contains the end of the preamble transmission plus three subframes and has length ra-ResponseWindowSize subframes. The specific RA-RNTI associated with the PRACH in which the Random Access Preamble is transmitted, is computed as: RA-RNTI=1+t_id+10*f_id. Where t_id may be the index of the first subframe of the specified PRACH (0≤t_id<10), and f_id is the index of the specified PRACH within that subframe, in ascending order of frequency domain (0≤f_id<6). The UE may stop monitoring for RAR(s) after successful reception of a RAR containing random access preamble identifiers that matches the transmitted random access preamble.

According to some of the various aspects of embodiments, if a downlink assignment for this TTI (transmission time interval) has been received on the PDCCH for the RA-RNTI and the received TB (transport block) is successfully decoded, the UE may regardless of the possible occurrence of a measurement gap: if the RAR contains a backoff indicator (BI) subheader, set the backoff parameter value in the UE employing the BI field of the backoff indicator subheader, else, set the backoff parameter value in the UE to zero ms. If the RAR contains a random access preamble identifier corresponding to the transmitted random access preamble, the UE may consider this RAR reception successful and apply the following actions for the serving cell where the random access preamble was transmitted: process the received riming advance command for the cell group in which the preamble was transmitted, indicate the preambleInitialReceivedTargetPower and the amount of power ramping applied to the latest preamble transmission to lower layers (i.e., (PREAMBLE_TRANSMISSION_COUNTER−1)*powerRampingStep); process the received uplink grant value and indicate it to the lower layers; the uplink grant is applicable to uplink of the cell in which the preamble was transmitted. If ra-PreambleIndex was explicitly signalled and it was not zero (e.g., not selected by MAC), consider the random access procedure successfully completed. Otherwise, if the Random Access Preamble was selected by UE MAC, set the Temporary C-RNTI to the value received in the RAR message. When an uplink transmission is required, e.g., for contention resolution, the eNB may not provide a grant smaller than 56 bits in the Random Access Response.

According to some of the various aspects of embodiments, if no RAR is received within the RAR window, or if none of all received RAR contains a random access preamble identifier corresponding to the transmitted random access preamble, the random access response reception may considered not successful. If RAR is not received, UE may increment PREAMBLE_TRANSMISSION_COUNTER by 1. If PREAMBLE_TRANSMISSION_COUNTER=preambleTransMax+1 and random access preamble is transmitted on the PCell, then UE may indicate a random access problem to upper layers (RRC). This may result in radio link failure. If PREAMBLE_TRANSMISSION_COUNTER=preambleTransMax+1 and the random access preamble is transmitted on an SCell, then UE may consider the random access procedure unsuccessfully completed. UE may stay in RRC connected mode and keep the RRC connection active eventhough a random access procedure unsuccessfully completed on a secondary TAG. According to some of the various aspects of embodiments, at completion of the random access procedure, the UE may discard explicitly signalled ra-PreambleIndex and ra-PRACH-MaskIndex, if any; and flush the HARQ buffer used for transmission of the MAC PDU in the Msg3 buffer. In addition, the RN may resume the suspended RN subframe configuration, if any.

According to some of the various aspects of embodiments, a UE may have a configurable timer timeAlignmentTimer per TAG. The timeAlignmentTimer is used to control how long the UE considers the Serving Cells belonging to the associated TAG to be uplink time aligned (in-sync). When a Timing Advance Command MAC control element is received, the UE may apply the riming advance command for the indicated TAG, and start or restart the timeAlignmentTimer associated with the indicated TAG. When a timing advance command is received in a RAR message for a serving cell belonging to a TAG and if the random access preamble was not selected by UE MAC, the UE may apply the timing advance command for this TAG, and may start or restart the timeAlignmentTimer associated with this TAG. When a timeAlignmentTimer associated with the pTAG expires, the UE may: flush all HARQ buffers for all serving cells; notify RRC to release PUCCH/SRS for all serving cells; clear any configured downlink assignments and uplink grants; and consider all running timeAlignmentTimers as expired. When a timeAlignmentTimer associated with an sTAG expires, then for all Serving Cells belonging to this TAG, the UE may flush all HARQ buffers; and notify RRC to release SRS. The UE may not perform any uplink transmission on a serving Cell except the random access preamble transmission when the timeAlignmentTimer associated with the TAG to which this serving cell belongs is not running. When the timeAlignmentTimer associated with the pTAG is not running, the UE may not perform any uplink transmission on any serving cell except the random access preamble transmission on the PCell. A UE stores or maintains N_TA (current timing advance value of an sTAG) upon expiry of associated timeAlignmentTimer. The UE may apply a received timing advance command MAC control element and starts associated timeAlignmentTimer. Transmission of the uplink radio frame number i from the UE may start $(N_{TA}+N_{TA\ offset}) \times T_s$ seconds before the start of the corresponding downlink radio frame at the UE, where $0 \le N_{TA} \le 20512$. In an example implementation, $N_{TA\ offset}=0$ for frame structure type 1 (FDD) and $N_{TA\ offset}=624$ for frame structure type 2 (TDD).

According to some of the various aspects of embodiments, upon reception of a timing advance command for a TAG containing the primary cell, the UE may adjust uplink transmission timing for PUCCH/PUSCH/SRS of the primary cell based on the received timing advance command. The UL transmission timing for PUSCH/SRS of a secondary cell may be the same as the primary cell if the secondary cell and the primary cell belong to the same TAG. Upon reception of a timing advance command for a TAG not containing the primary cell, the UE may adjust uplink transmission timing for PUSCH/SRS of secondary cells in the TAG based on the received timing advance command where the UL transmission timing for PUSCH/SRS is the same for all the secondary cells in the TAG.

The timing advance command for a TAG may indicates the change of the uplink timing relative to the current uplink timing for the TAG as multiples of 16Ts (Ts: sampling time unit). The start timing of the random access preamble may obtained employing a downlink synchronization time in the same TAG. In case of random access response, an 11-bit timing advance command, TA, for a TAG may indicate NTA values by index values of TA=0, 1, 2, . . . , 1282, where an amount of the time alignment for the TAG may be given by NTA=TA×16. In other cases, a 6-bit timing advance command, TA, for a TAG may indicate adjustment of the current NTA value, NTA,old, to the new NTA value, NTA,new, by index values of TA=0, 1, 2, . . . , 63, where NTA,new=NTA, old+(TA−31)×16. Here, adjustment of NTA value by a positive or a negative amount indicates advancing or delaying the uplink transmission timing for the TAG by a given amount respectively. For a timing advance command received on subframe n, the corresponding adjustment of the uplink transmission timing may apply from the beginning of subframe n+6. For serving cells in the same TAG, when the UE's uplink PUCCH/PUSCH/SRS transmissions in subframe n and subframe n+1 are overlapped due to the timing adjustment, the UE may complete transmission of subframe n and not transmit the overlapped part of subframe n+1. If the received downlink timing changes and is not compensated or is only partly compensated by the uplink timing adjustment without timing advance command, the UE may change NTA accordingly.

Downlink frames and subframes of downlink carriers may be time aligned (by the base station) in carrier aggregation and multiple TAG configuration. Time alignment errors may be tolerated to some extend. For example, for intra-band contiguous carrier aggregation, time alignment error may not exceed 130 ns. In another example, for intra-band non-contiguous carrier aggregation, time alignment error may not exceed 260 ns. In another example, for inter-band carrier aggregation, time alignment error may not exceed 1.3 µs.

The UE may have capability to follow the frame timing change of the connected base station. The uplink frame transmission may take place $(N_{TA}+N_{TA\ offset})\times T_s$ before the reception of the first detected path (in time) of the corresponding downlink frame from the reference cell. The UE may be configured with a pTAG containing the PCell. The pTAG may also contain one or more SCells, if configured. The UE may also be configured with one or more sTAGs, in which case the pTAG may contain one PCell and the sTAG may contain at least one SCell with configured uplink. In pTAG, UE may use the PCell as the reference cell for deriving the UE transmit timing for cells in the pTAG. The UE may employ a synchronization signal on the reference cell to drive downlink timing. When a UE is configured with an sTAG, the UE may use an activated SCell from the sTAG for deriving the UE transmit timing for cell in the sTAG.

In at least one of the various embodiments, uplink physical channel(s) may correspond to a set of resource elements carrying information originating from higher layers. The following example uplink physical channel(s) may be defined for uplink: a) Physical Uplink Shared Channel (PUSCH), b) Physical Uplink Control Channel (PUCCH), c) Physical Random Access Channel (PRACH), and/or the like. Uplink physical signal(s) may be used by the physical layer and may not carry information originating from higher layers. For example, reference signal(s) may be considered as uplink physical signal(s). Transmitted signal(s) in slot(s) may be described by one or several resource grids including, for example, subcarriers and SC-FDMA or OFDMA symbols. Antenna port(s) may be defined such that the channel over which symbol(s) on antenna port(s) may be conveyed and/or inferred from the channel over which other symbol(s) on the same antenna port(s) is/are conveyed. There may be one resource grid per antenna port. The antenna port(s) used for transmission of physical channel(s) or signal(s) may depend on the number of antenna port(s) configured for the physical channel(s) or signal(s).

According to some of the various embodiments, physical downlink control channel(s) may carry transport format, scheduling assignments, uplink power control, and other control information. PDCCH may support multiple formats. Multiple PDCCH packets may be transmitted in a subframe. According to some of the various embodiments, scheduling control packet(s) may be transmitted for packet(s) or group(s) of packets transmitted in downlink shared channel(s). Scheduling control packet(s) may include information about subcarriers used for packet transmission(s). PDCCH may also provide power control commands for uplink channels. PDCCH channel(s) may carry a plurality of downlink control packets in subframe(s). Enhance PDCCH may be implemented in a cell as an option to carrier control information. According to some of the various embodiments, PHICH may carry the hybrid-ARQ (automatic repeat request) ACK/NACK.

Other arrangements for PCFICH, PHICH, PDCCH, enhanced PDCCH, and/or PDSCH may be supported. The configurations presented here are for example purposes. In another example, resources PCFICH, PHICH, and/or PDCCH radio resources may be transmitted in radio resources including a subset of subcarriers and pre-defined time duration in each or some of the subframes. In an example, PUSCH resource(s) may start from the first symbol. In another example embodiment, radio resource configuration(s) for PUSCH, PUCCH, and/or PRACH (physical random access channel) may use a different configuration. For example, channels may be time multiplexed, or time/frequency multiplexed when mapped to uplink radio resources.

According to some of the various aspects of embodiments, the physical layer random access preamble may comprise a cyclic prefix of length Tcp and a sequence part of length Tseq. The parameter values may be pre-defined and depend on the frame structure and a random access configuration. In an example embodiment, Tcp may be 0.1 msec, and Tseq may be 0.9 msec. Higher layers may control the preamble format. The transmission of a random access preamble, if triggered by the MAC layer, may be restricted to certain time and frequency resources. The start of a random access preamble may be aligned with the start of the corresponding uplink subframe at a wireless device with N_TA=0.

According to an example embodiment, random access preambles may be generated from Zadoff-Chu sequences with a zero correlation zone, generated from one or several root Zadoff-Chu sequences. In another example embodiment, the preambles may also be generated using other random sequences such as Gold sequences. The network may configure the set of preamble sequences a wireless device may be allowed to use. According to some of the various aspects of embodiments, there may be a multitude of preambles (e.g. 64) available in cell(s). From the physical layer perspective, the physical layer random access procedure may include the transmission of random access preamble(s) and random access response(s). Remaining message(s) may be scheduled for transmission by a higher layer on the shared data channel and may not be considered part of the physical layer random access procedure. For example, a random access channel may occupy 6 resource blocks in a subframe or set of consecutive subframes reserved for random access preamble transmissions.

According to some of the various embodiments, the following actions may be followed for a physical random access procedure: 1) layer 1 procedure may be triggered upon request of a preamble transmission by higher layers; 2) a preamble index, a target preamble received power, a corresponding RA-RNTI (random access-radio network temporary identifier) and/or a PRACH resource may be indicated by higher layers as part of a request; 3) a preamble transmission power P_PRACH may be determined; 4) a preamble sequence may be selected from the preamble sequence set using the preamble index; 5) a single preamble may be transmitted using selected preamble sequence(s) with transmission power P_PRACH on the indicated PRACH resource; 6) detection of a PDCCH with the indicated RAR may be attempted during a window controlled by higher layers; and/or the like. If detected, the corresponding downlink shared channel transport block may be passed to higher layers. The higher layers may parse transport block(s) and/or indicate an uplink grant to the physical layer(s).

Before a wireless device initiates transmission of a random access preamble, it may access one or many of the following types of information: a) available set(s) of PRACH resources for the transmission of a random access preamble; b) group(s) of random access preambles and set(s) of available random access preambles in group(s); c) random access response window size(s); d) power-ramping factor(s); e) maximum number(s) of preamble transmission(s); f) initial preamble power; g) preamble format based offset(s); h) contention resolution timer(s); and/or the like. These parameters may be updated from upper layers or may be received from the base station before random access procedure(s) may be initiated.

According to some of the various aspects of embodiments, a wireless device may select a random access preamble using available information. The preamble may be signaled by a base station or the preamble may be randomly selected by the wireless device. The wireless device may determine the next available subframe containing PRACH permitted by restrictions given by the base station and the physical layer timing requirements for TDD or FDD. Subframe timing and the timing of transmitting the random access preamble may be determined based, at least in part, on synchronization signals received from the base station and/or the information received from the base station. The wireless device may proceed to the transmission of the random access preamble when it has determined the timing. The random access preamble may be transmitted on a second plurality of subcarriers on the first uplink carrier.

According to some of the various aspects of embodiments, once a random access preamble is transmitted, a wireless device may monitor the PDCCH of a primary carrier for random access response(s), in a random access response window. There may be a pre-known identifier in PDCCH that identifies a random access response. The wireless device may stop monitoring for random access response(s) after successful reception of a random access response containing random access preamble identifiers that matches the transmitted random access preamble and/or a random access response address to a wireless device identifier. A base station random access response may include a time alignment command. The wireless device may process the received time alignment command and may adjust its uplink transmission timing according the time alignment value in the command. For example, in a random access response, a time alignment command may be coded using 11 bits, where an amount of the time alignment may be based on the value in the command. In an example embodiment, when an uplink transmission is required, the base station may provide the wireless device a grant for uplink transmission.

If no random access response is received within the random access response window, and/or if none of the received random access responses contains a random access preamble identifier corresponding to the transmitted random access preamble, the random access response reception may be considered unsuccessful and the wireless device may, based on the backoff parameter in the wireless device, select a random backoff time and delay the subsequent random access transmission by the backoff time, and may retransmit another random access preamble.

According to some of the various aspects of embodiments, a wireless device may transmit packets on an uplink carrier. Uplink packet transmission timing may be calculated in the wireless device using the timing of synchronization signal(s) received in a downlink. Upon reception of a timing alignment command by the wireless device, the wireless device may adjust its uplink transmission timing. The timing alignment command may indicate the change of the uplink timing relative to the current uplink timing. The uplink transmission timing for an uplink carrier may be determined using time alignment commands and/or downlink reference signals.

According to some of the various aspects of embodiments, a time alignment command may indicate timing adjustment for transmission of signals on uplink carriers. For example, a time alignment command may use 6 bits. Adjustment of the uplink timing by a positive or a negative amount indicates advancing or delaying the uplink transmission timing by a given amount respectively.

For a timing alignment command received on subframe n, the corresponding adjustment of the timing may be applied with some delay, for example, it may be applied from the beginning of subframe n+6. When the wireless device's uplink transmissions in subframe n and subframe n+1 are overlapped due to the timing adjustment, the wireless device may transmit complete subframe n and may not transmit the overlapped part of subframe n+1.

According to some of the various aspects of embodiments, a wireless device may be preconfigured with one or more carriers. When the wireless device is configured with more than one carrier, the base station and/or wireless device may activate and/or deactivate the configured carriers. One of the carriers (the primary carrier) may always be activated. Other carriers may be deactivated by default and/or may be activated by a base station when needed. A base station may activate and deactivate carriers by sending an activation/deactivation MAC control element. Furthermore, the UE may maintain a carrier deactivation timer per configured carrier and deactivate the associated carrier upon its expiry. The same initial timer value may apply to instance(s) of the carrier deactivation timer. The initial value of the timer may be configured by a network. The configured carriers (unless the primary carrier) may be initially deactivated upon addition and after a handover.

According to some of the various aspects of embodiments, if a wireless device receives an activation/deactivation MAC control element activating the carrier, the wireless device may activate the carrier, and/or may apply normal carrier operation including: sounding reference signal transmissions on the carrier (if the carrier is uplink time aligned), CQI (channel quality indicator)/PMI (precoding matrix indicator)/RI (ranking indicator) reporting for the carrier, PDCCH monitoring on the carrier, PDCCH monitoring for the carrier, start or restart the carrier deactivation timer associated with the carrier, and/or the like. If the device receives an activation/deactivation MAC control element deactivating the carrier, and/or if the carrier deactivation timer associated with the activated carrier expires, the base station or device may deactivate the carrier, and may stop the carrier deactivation timer associated with the carrier, and/or may flush HARQ buffers associated with the carrier.

If PDCCH on a carrier scheduling the activated carrier indicates an uplink grant or a downlink assignment for the activated carrier, the device may restart the carrier deactivation timer associated with the carrier. When a carrier is deactivated, the wireless device may not transmit SRS (sounding reference signal) for the carrier, may not report CQI/PMI/RI for the carrier, may not transmit on UL-SCH for the carrier, may not monitor the PDCCH on the carrier, and/or may not monitor the PDCCH for the carrier.

In this specification, "a" and "an" and similar phrases are to be interpreted as "at least one" and "one or more." In this specification, the term "may" is to be interpreted as "may, for example," In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the invention may also be implemented in TDD communication systems. The disclosed methods and systems may be implemented in wireless or wireline systems. The features of various embodiments presented in this invention may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A method comprising:
   a) receiving, by a wireless device configured to communicate employing a plurality of cells, at least one control message from a base station, said at least one control message causing in said wireless device:
      i) configuration of a primary cell and at least one secondary cell in said plurality of cells;
      ii) assignment of each of said at least one secondary cell to a cell group in a plurality of cell groups, said plurality of cell groups comprising:
         (1) a primary cell group comprising a first subset of said plurality of cells, said first subset comprising said primary cell; and
         (2) a secondary cell group comprising a second subset of said at least one secondary cell; and
      iii) configuration of a time alignment timer for each of said plurality of cell groups, said time alignment timer starting or restarting in response to said wireless device receiving a timing advance command to adjust a timing advance of a commanded cell group in said plurality of cell groups;
   b) generating a first updated timing advance by updating a first timing advance of said secondary cell group, by said wireless device, employing at least one first timing advance command for said secondary cell group;

c) storing, by said wireless device, said first updated timing advance upon expiry of an associated time alignment timer of said secondary cell group;

d) receiving, by said wireless device, a second timing advance command for said secondary cell group with a timing advance value of zero, said second timing advance command starting said associated time alignment timer;

e) receiving, by said wireless device, an uplink grant for an activated cell of said secondary cell group; and f) transmitting, by said wireless device, uplink signals in radio resources identified in said uplink grant with a timing advance equal to said stored first updated timing advance.

2. The method of claim 1, wherein:
a) uplink transmissions by said wireless device in said primary cell group employ a first synchronization signal transmitted on said primary cell as a primary timing reference; and
b) said second subset comprises a reference secondary cell, uplink transmissions in said secondary cell group employing a second synchronization signal on said reference secondary cell as a secondary timing reference.

3. The method of claim 2, wherein said first timing advance is equal to a difference between received timing of said secondary timing reference and transmission timing of said uplink signals.

4. The method of claim 1, wherein said at least one control message comprising a plurality of media access control dedicated parameters comprises:
a) a time alignment timer value for said primary cell group; and
b) a sequence of at least one element, each element comprising a time alignment timer value and a cell group index, said time alignment timer value associated with a cell group identified by a cell group index, each time alignment timer value being selected from a finite set of predetermined values.

5. The method of claim 1, wherein said first timing advance value is initiated by a timing advance value in a random access response for a random access preamble transmitted in said secondary cell group.

6. The method of claim 1, wherein said first timing advance value is set to zero when said secondary cell group is configured.

7. The method of claim 1, wherein said stored first updated timing advance may be released in said wireless device when said secondary cell group is released.

8. The method of claim 1, further comprising changing said secondary cell group from an out-of-sync state to an in-sync state in response to said second timing advance command having a timing advance value of zero.

9. The method of claim 1, further comprising transmitting a sounding reference signal in a cell in said secondary cell group in response to receiving said second timing advance command if said at least one control message configures regular transmission of said sounding reference signal on said cell.

10. The method of claim 1, further comprising receiving, by said wireless device, a third timing advance command for said secondary cell group subsequent to reception of said second timing advance command when said associated time alignment timer is running, said third timing advance command having a non-zero timing advance value, said third timing advance command restarting said associated time alignment timer.

11. A method comprising:
a) receiving, by a wireless device configured to communicate employing a plurality of cells, at least one control message from a base station, said at least one control message causing in said wireless device:
  i) configuration of a primary cell and at least one secondary cell in said plurality of cells;
  ii) assignment of each of said at least one secondary cell to a cell group in a plurality of cell groups, said plurality of cell groups comprising:
    (1) a primary cell group comprising a first subset of said plurality of cells, said first subset comprising said primary cell; and
    (2) a secondary cell group comprising a second subset of said at least one secondary cell; and
  iii) configuration of a time alignment timer for each of said plurality of cell groups, said time alignment timer starting or restarting in response to said wireless device receiving a timing advance command to adjust an timing advance of a commanded cell group in said plurality of cell groups;

b) generating a first updated timing advance by updating a first timing advance of said secondary cell group, by said wireless device, employing at least one first timing advance command for said secondary cell group;

c) storing, by said wireless device, said first updated timing advance upon expiry of an associated time alignment timer of said secondary cell group;

d) receiving, by said wireless device, a second timing advance command for said secondary cell group with a timing advance value of zero, said second timing advance command starting said associated time alignment timer; and e) transmitting, by said wireless device, uplink signals in radio resources identified in a received uplink grant with an timing advance equal to said stored first updated timing advance.

12. The method of claim 11, further comprising receiving, by said wireless device, a third timing advance command for said secondary cell group subsequent to reception of said second timing advance command when said associated time alignment timer is running, said third timing advance command having a non-zero timing advance value, said third timing advance command restarting said associated time alignment timer.

13. The method of claim 11, wherein said updating of said first timing advance further employs changes in a received downlink timing if said received downlink timing changes are not compensated or are partly compensated by said at least one timing advance command.

14. The method of claim 11, wherein said first timing advance value is set to zero when said secondary cell group is configured.

15. The method of claim 11, wherein said stored first updated timing advance may be released in said wireless device when said secondary cell group is released.

16. A wireless device comprising:
a) one or more communication interfaces;
b) one or more processors; and
c) memory storing instructions that, when executed, cause said wireless device to:
  i) receive at least one control message from a base station, said at least one control message causing in said wireless device:

(1) assignment of each of at least one secondary cell to a cell group in a plurality of cell groups, said plurality of cell groups comprising:
  (a) a primary cell group comprising a first subset of a plurality of cells, said first subset comprising a primary cell; and
  (b) at least one secondary cell group, a secondary cell group in said at least one secondary cell group comprising a second subset of said at least one secondary cell; and
(2) configuration of a time alignment timer for each of said plurality of cell groups, said time alignment timer starting or restarting in response to said wireless device receiving a timing advance command to adjust an timing advance of a commanded cell group in said plurality of cell groups;

ii) generating a first updated timing advance by updating a first timing advance of said secondary cell group, by said wireless device, employing at least one first timing advance command for said secondary cell group;

iii) storing, by said wireless device, said first updated timing advance upon expiry of an associated time alignment timer of said secondary cell group;

iv) receiving, by said wireless device, a second timing advance command for said secondary cell group with a timing advance value of zero, said second timing advance command starting said associated time alignment timer; and v) transmitting, by said wireless device, uplink signals in radio resources identified in a received uplink grant with an timing advance equal to said stored first updated timing advance.

17. The wireless device of claim 16, wherein said first timing advance value is set to zero when said secondary cell group is configured.

18. The wireless device of claim 16, wherein said stored first updated timing advance may be released in said wireless device when said secondary cell group is released.

19. The wireless device of claim 16, wherein a timing advance command in said at least one first timing advance command comprises:
  a) a timing advance command value; and
  b) an index of said secondary cell group.

20. The wireless device of claim 16, wherein:
  a) uplink transmissions by said wireless device in said primary cell group employ a first synchronization signal transmitted on said primary cell as a primary timing reference; and
  b) said second subset comprises a reference secondary cell, uplink transmissions in said secondary cell group employing a second synchronization signal on said reference secondary cell as a secondary timing reference.

* * * * *